US010856046B2

United States Patent
Fu et al.

(10) Patent No.: US 10,856,046 B2
(45) Date of Patent: Dec. 1, 2020

(54) VIDEO PLAYBACK BUFFER CONTROL

(71) Applicant: Telefonaktiebolaget LM Ericsson (publ), Stockholm (SE)

(72) Inventors: Jing Fu, Solna (SE); Steven Corroy, Järfälla (SE); Selim Ickin, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/060,776

(22) PCT Filed: Dec. 18, 2015

(86) PCT No.: PCT/EP2015/080597
§ 371 (c)(1),
(2) Date: Jun. 8, 2018

(87) PCT Pub. No.: WO2017/102031
PCT Pub. Date: Jun. 22, 2017

(65) Prior Publication Data
US 2018/0367844 A1     Dec. 20, 2018

(51) Int. Cl.
*H04N 21/442* (2011.01)
*H04N 21/433* (2011.01)
(Continued)

(52) U.S. Cl.
CPC ....... *H04N 21/4424* (2013.01); *H04L 65/604* (2013.01); *H04L 65/80* (2013.01);
(Continued)

(58) Field of Classification Search
None
See application file for complete search history.

(56) References Cited

U.S. PATENT DOCUMENTS

| | | | |
|---|---|---|---|
| 6,745,169 B1 | 6/2004 | Schlang et al. | |
| 9,026,735 B1 * | 5/2015 | Torok | G06F 5/065 |
| | | | 711/129 |

(Continued)

FOREIGN PATENT DOCUMENTS

| | | |
|---|---|---|
| WO | 2015/088407 A1 | 6/2015 |
| WO | 2015/162576 A1 | 10/2015 |

OTHER PUBLICATIONS

International Search Report and Written Opinion dated Jun. 1, 2016 issued in International Application No. PCT/EP2015/080597. (10 pages).

(Continued)

*Primary Examiner* — Justin E Shepard
(74) *Attorney, Agent, or Firm* — Rothwell, Figg, Ernst & Manbeck, P.C.

(57) ABSTRACT

A buffer status metric representing a current amount of video packets in a video playback buffer (303) of a user device (300). A buffer status action is triggered based on the buffer status action and at least one of a mobility metric representing a mobility pattern of the user device (300) and a radio quality metric representing a signal strength of a radio channel carrying video packets towards the user device (300). The embodiments also relate to determination of a buffer control model (142) that can be used in order to control the video playback buffer based on the input metrics. The embodiments achieve a more efficient control of video playback buffers (303) and may reduce the risk of freezes during video playback.

22 Claims, 11 Drawing Sheets

(51) Int. Cl.
*H04N 21/414* (2011.01)
*H04N 21/258* (2011.01)
*H04N 21/45* (2011.01)
*H04L 29/06* (2006.01)
*H04N 21/44* (2011.01)
*H04W 4/029* (2018.01)
*H04N 21/845* (2011.01)
*H04L 1/20* (2006.01)

(52) U.S. Cl.
CPC . *H04N 21/25841* (2013.01); *H04N 21/41407* (2013.01); *H04N 21/41422* (2013.01); *H04N 21/4331* (2013.01); *H04N 21/44004* (2013.01); *H04N 21/4524* (2013.01); *H04L 1/20* (2013.01); *H04N 21/442* (2013.01); *H04N 21/44209* (2013.01); *H04N 21/8456* (2013.01); *H04W 4/029* (2018.02)

(56) References Cited

U.S. PATENT DOCUMENTS

| | | | |
|---|---|---|---|
| 2009/0019505 A1* | 1/2009 | Gopalakrishnan | H04L 1/0001 725/109 |
| 2010/0190504 A1* | 7/2010 | Lee | H04L 1/1835 455/450 |
| 2014/0156863 A1* | 6/2014 | Gao | H04L 65/4084 709/231 |
| 2014/0274195 A1* | 9/2014 | Singh | H04W 52/241 455/522 |
| 2016/0105671 A1* | 4/2016 | Sridhar | H04L 65/4084 375/240.02 |

OTHER PUBLICATIONS

Zambelli et al., "IIS Smooth Streaming Technical Overview", Microsoft Corporation (Mar. 1, 2009), XP055178158. (17 pages).
European Communication dated May 31, 2019 issued in European Patent Application No. 15816764.3 (9 pages).

* cited by examiner

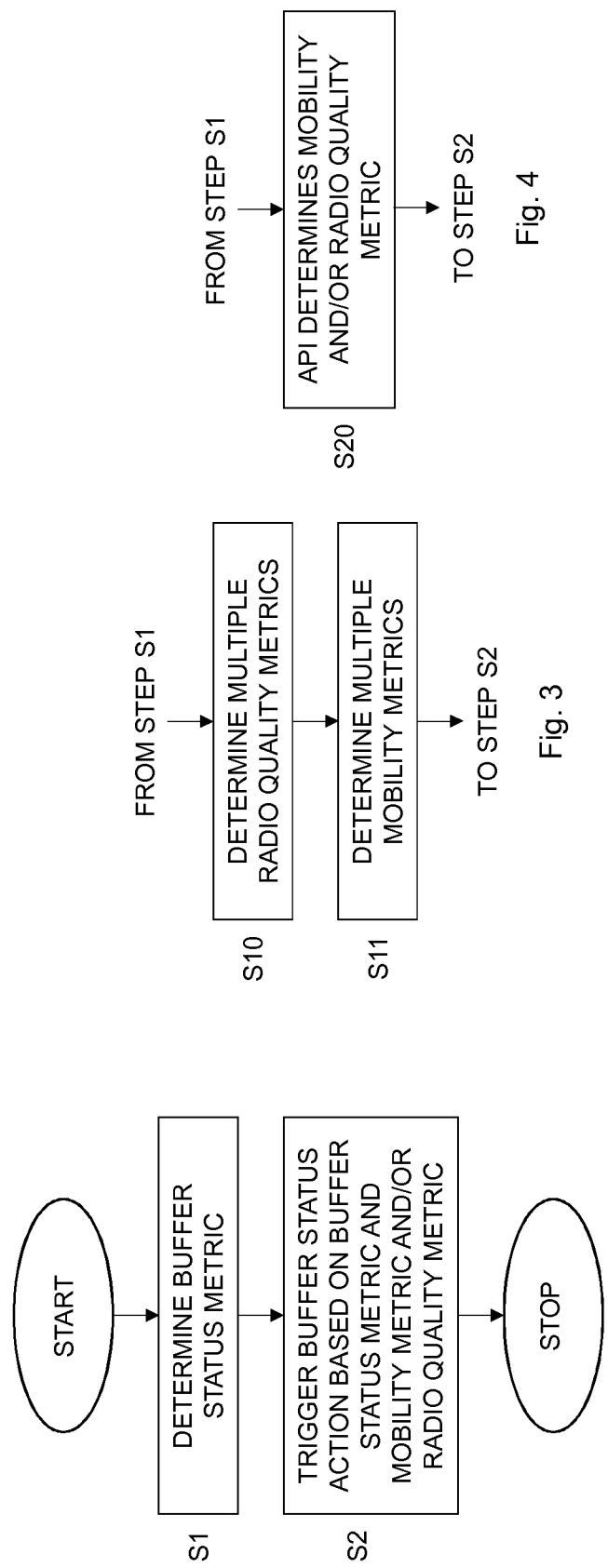

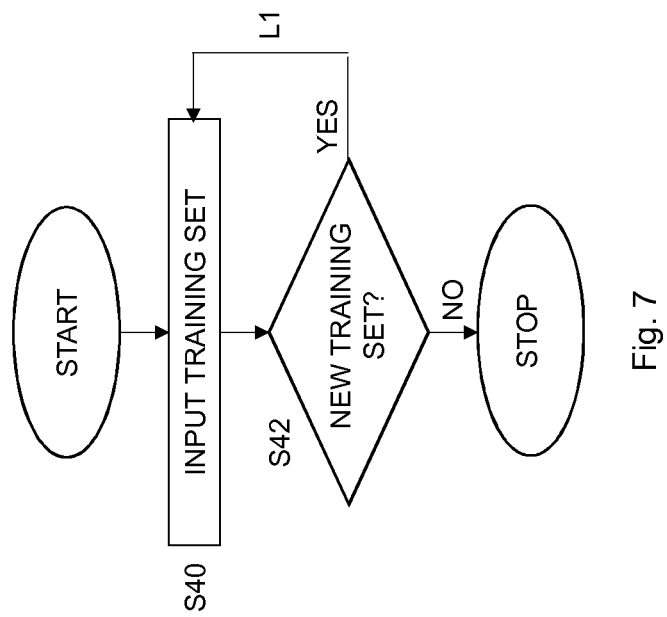
Fig. 7
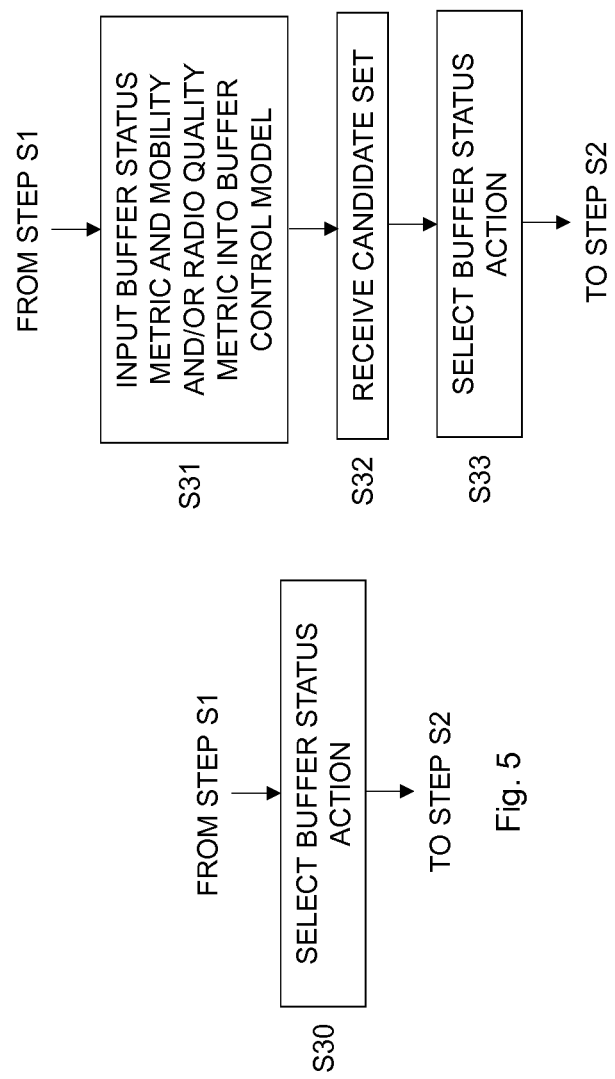
Fig. 6
Fig. 5

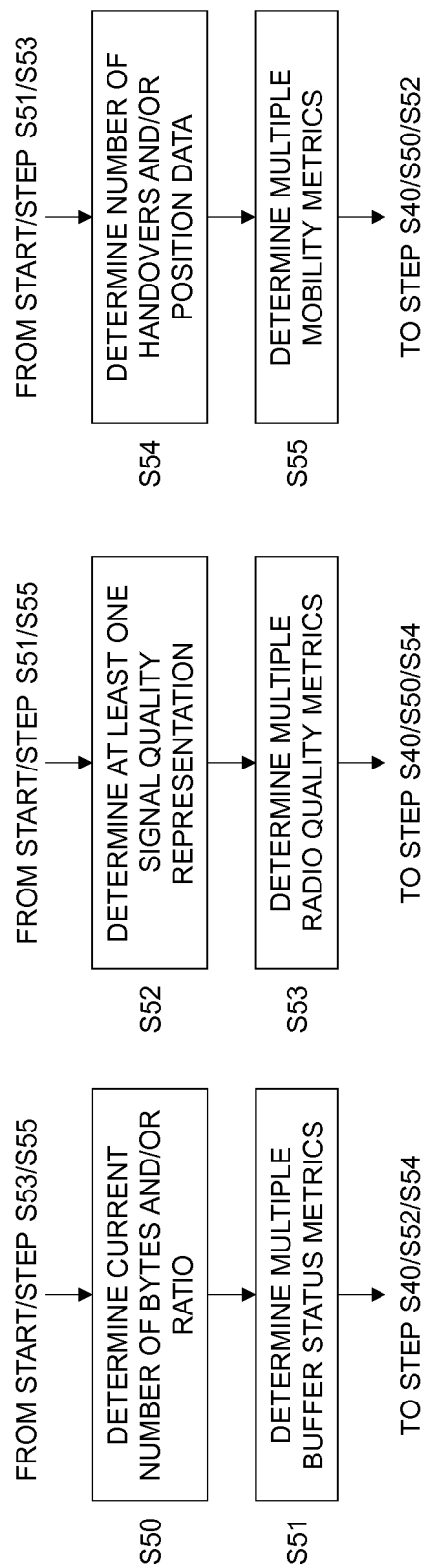

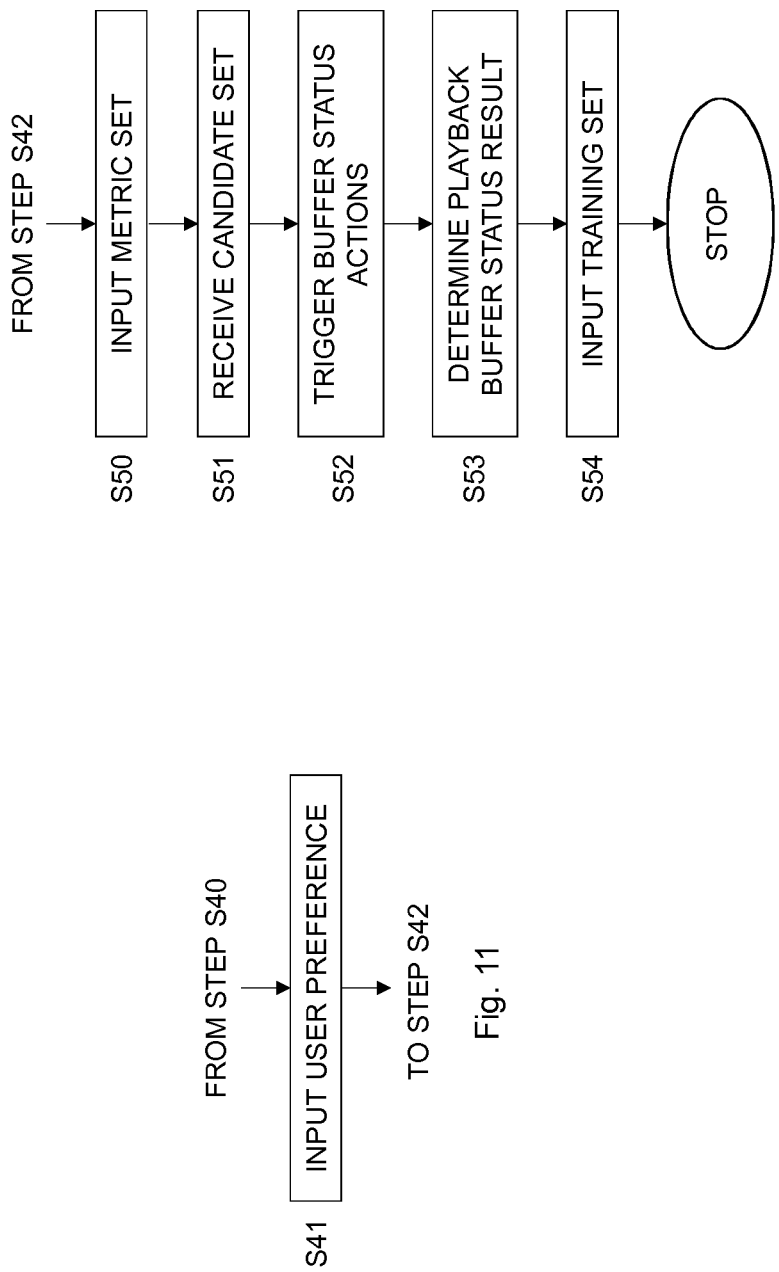

DELAY
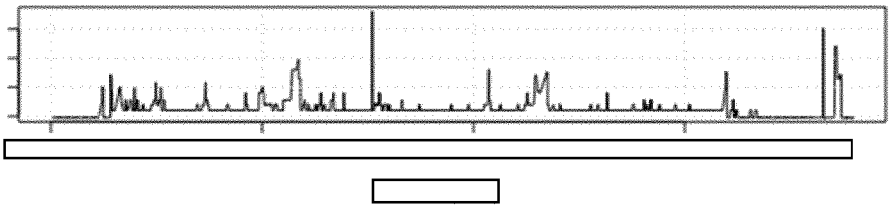
VERTICAL HANDOVER
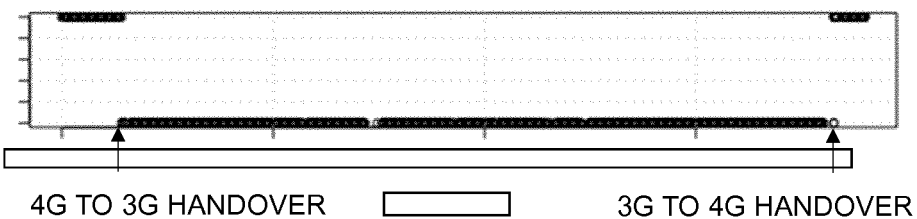
4G TO 3G HANDOVER         3G TO 4G HANDOVER
LONGITUDE COORDINATE
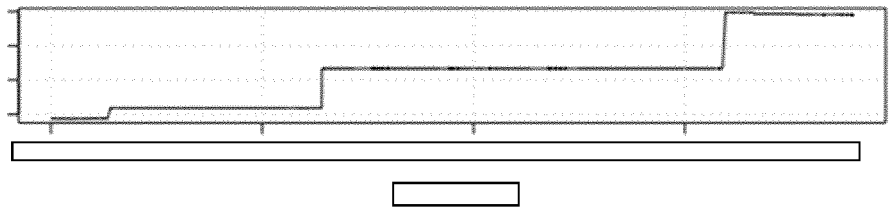
LATITUDE COORDINATE
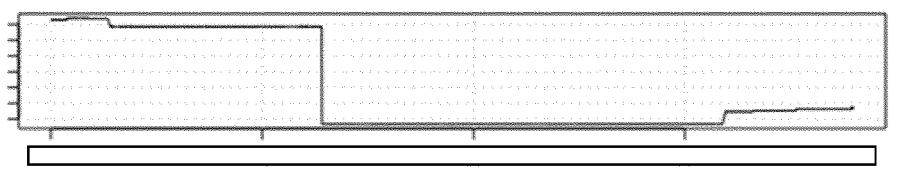
| UE ENTERS TUNNEL | LTE RSRQ | UE EXITS TUNNEL |
0    10    20    30
LTE RSRQ ATTENUATES, INITIATE RE-BUFFERING
TIME (MIN)
Fig. 13

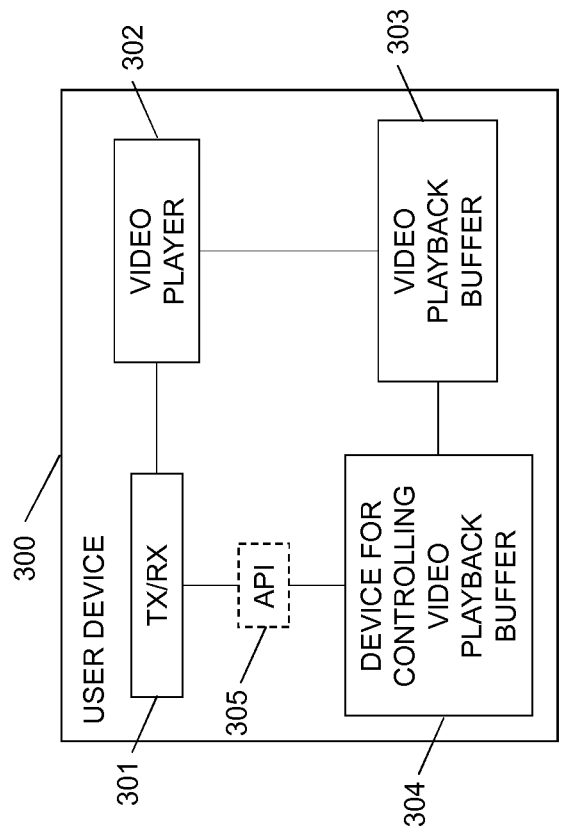
Fig. 22
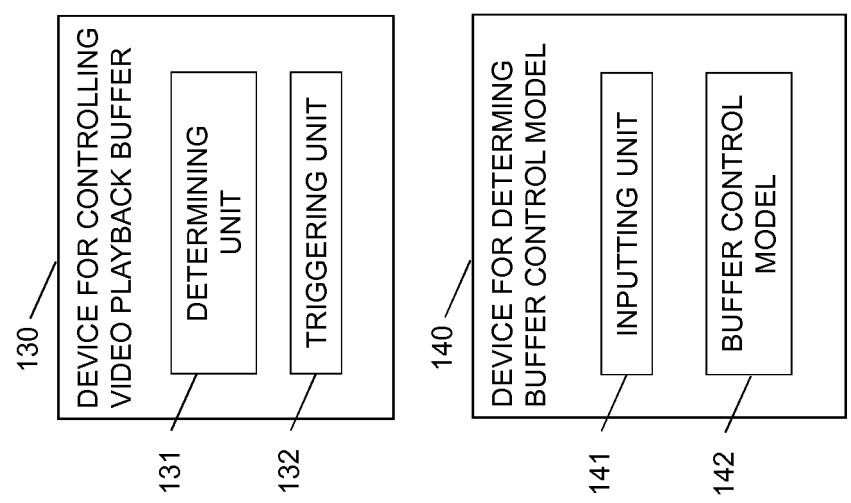
Fig. 20
Fig. 21

VIDEO PLAYBACK BUFFER CONTROL

CROSS REFERENCE TO RELATED APPLICATION(S)

This application is a 35 U.S.C. § 371 National Stage of International Patent Application No. PCT/EP2015/080597, filed Dec. 18, 2015, designating the United States, which is incorporated by reference.

TECHNICAL FIELD

The present embodiments generally relate to video playback buffer control, and in particular to methods, devices and computer programs for controlling a video playback buffer and for determining a buffer control model.

BACKGROUND

Video streaming applications are both energy demanding and necessitate a high amount of data traffic. In case of temporal problems, such as freezes, the video streaming application continues to consume energy as the central processing unit (CPU) and the screen are still active. During the freeze, re-transmission of video data occurs. This sequence of events all waste energy both at the user device and also in the radio access point. Therefore, it is often recommended to avoid freezes as much as possible. In addition, freezes in video playback lowers the quality of experience (QoE) of the end user.

In existing adaptive mechanisms, the video consumption rate from a video playback buffer is adapted based on the arrival rate of video packets at the video playback buffer. For example, the video consumption rate from the video playback buffer is reduced when the arrival rate of video packets at the video playback buffer decreases due to, for instance, a reduction in network throughput.

These adaptive mechanisms in the video player applications of user devices are often based on the video playback buffer state, i.e. the amount of video packets in the video playback buffer, and application layer metrics. Such application layer metrics include, for instance, a delay metric representing the time interval between arrivals of video packets at the video playback buffer and a throughput metric representing the amount of video packets arrived at the video playback buffer during a given period of time.

The measurements conducted at the application layer to get the application layer metrics are used to determine when to request more video packets during a video streaming session. If the amount of video packets in the video playback buffer is reduced below a certain threshold, the video player requests more video packets and fills the video playback buffer as long as the available network throughput allows.

However, measurements in the application layer may in some instances not be enough to give timely decisions to prevent freezes during video playback. In clear contrast, usage of application layer metrics may cause the video player application to trigger requests for video packets at a too late point in time. As a result, the video playback buffer may become depleted before more video packets arrive at the video player application and the video playback buffer, thereby causing a freeze in the video playback.

There is, thus, a need for a more efficient control of video playback buffers that may reduce the risk of freezes during video playback.

SUMMARY

It is an objective to provide a more efficient control of video playback buffers.

This and other objectives are met by embodiments as described herein.

An aspect of the embodiments relates to a method of controlling a video playback buffer in a user device. The method comprises determining a buffer status metric representing a current amount of video packets in the video playback buffer. The method also comprises triggering a buffer status action based on the buffer status metric and at least one of a mobility metric representing a mobility pattern of the user device and a radio quality metric representing a signal strength of a radio channel carrying video packets towards the user device.

Another aspect of the embodiments relates to a device for controlling a video playback buffer. The device is configured to determine a buffer status metric representing a current amount of video packets in a video playback buffer in a user device. The device is also configured to trigger a buffer status action based on the buffer status metric and at least one of a mobility metric representing a mobility pattern of the user device and a radio quality metric representing a signal strength of a radio channel carrying video packets towards the user device.

A related aspect of the embodiments defines a device for controlling a video playback buffer. The device comprises a determining unit for determining a buffer status metric representing a current amount of video packets in the video playback buffer. The device also comprises a triggering unit for triggering a buffer status action based on the buffer status metric and at least one of a mobility metric representing a mobility pattern of a user device comprising the video playback buffer and a radio quality metric representing a signal strength of a radio channel carrying video packets towards the user device.

A further aspect of the embodiments relates to a method of determining a buffer control model. The method comprises (i) inputting, during a training phase and into a machine learning (ML) model, a training set comprising a buffer status metric representing a current amount of video packets in a video playback buffer, at least one of a mobility metric representing a mobility pattern of a user device comprising the video playback buffer and a radio quality metric representing a signal strength of a radio channel carrying video packets towards the user device, a buffer status action triggered to achieve a video playback buffer status result and a label indicating whether the buffer status action successfully achieved the video playback buffer status result or not. The method also comprises (ii) repeating, during the training phase, step (i) with different training sets to train the ML model into the buffer control model configured to output a candidate set of at least one buffer status action predicted by the buffer control model to achieve a defined video playback buffer status result based on a buffer status metric and at least one of a mobility metric and a radio quality metric.

Yet another aspect of the embodiments relates to a device for determining a buffer control model. The device is configured to input, during a training phase and into a ML model, a training set comprising a buffer status metric representing a current amount of video packets in a video playback buffer, at least one of a mobility metric representing a mobility pattern of a user device comprising the video playback buffer and a radio quality metric representing a signal strength of a radio channel carrying video packets towards the user device, a buffer status action triggered to achieve a video playback buffer status result, and a label indicating whether the buffer status action successfully achieved the video playback buffer status result or not. The device is also configured to repeat, during the training phase, input of different training sets to train the ML model into the buffer control model configured to output a candidate set of at least one buffer status action predicted by the buffer control model to achieve a defined video playback buffer status result based on a buffer status metric and at least one of a mobility metric and a radio quality metric.

A related aspect of the embodiments defines a device for determining a buffer control model. The device comprises an inputting unit for inputting, during a training phase and into a ML model, a training set comprising a buffer status metric representing a current amount of video packets in a video playback buffer, at least one of a mobility metric representing a mobility pattern of a user device comprising the video playback buffer and a radio quality metric representing a signal strength of a radio channel carrying video packets towards the user device, a buffer status action triggered to achieve a video playback buffer status result, and a label indicating whether the buffer status action successfully achieved the video playback buffer status result or not. The inputting device is also for repeating, during the training phase, input of different training sets to train the ML model into the buffer control model configured to output a candidate set of at least buffer status action predicted by the buffer control model to achieve a defined video playback buffer status result based on a buffer status metric and at least one of a mobility metric and a radio quality metric.

Further aspects of the embodiments define a user device comprising a device according to above and a network node comprising a device according to above.

A further aspect of the embodiments relates to a computer program comprising instructions, which when executed by at least one processor, cause the at least one processor to determine a buffer status metric representing a current amount of video packets in a video playback buffer. The at least one processor is also caused to trigger a buffer status action based on the buffer status metric and at least one of a mobility metric representing a mobility pattern of a user device comprising the video playback buffer and a radio quality metric representing a signal strength of a radio channel carrying video packets towards the user device.

Yet another aspect of the embodiments relates to a computer program comprising instructions, which when executed by at least one processor, cause the at least one processor to input, during a training phase and into a ML model, a training set comprising a buffer status metric representing a current amount of video packets in a video playback buffer, at least one of a mobility metric representing a mobility pattern of a user device comprising the video playback buffer and a radio quality metric representing a signal strength of a radio channel carrying video packets towards the user device, a buffer status action triggered to achieve a video playback buffer status result, and a label indicating whether the buffer status action successfully achieved the video playback buffer status result or not. The at least one processor is also caused to repeat, during the training phase, input of different training sets to train the ML model into the buffer control model configured to output a candidate set of at least buffer status action predicted by the buffer control model to achieve a defined video playback buffer status result based on a buffer status metric and at least one of a mobility metric and a radio quality metric.

Related aspects of the embodiments define a computer-program product comprising a computer-readable medium having stored thereon a computer program according to above and carrier comprising a computer program according to above. The carrier is one of an electronic signal, an optical signal, an electromagnetic signal, a magnetic signal, an electric signal, a radio signal, a microwave signal, or a computer-readable storage medium.

A further aspect of the embodiments relates to a buffer control model. The buffer control model is configured to receive a buffer status metric representing a current amount of video packets in a video playback buffer and at least one of a mobility metric representing a mobility pattern of a user device comprising the video playback buffer and a radio quality metric representing a signal strength of a radio channel carrying video packets towards the user device. The buffer control model is also configured to output a candidate set of at least one buffer status action predicted by the buffer control model to achieve a defined video playback buffer status result based on the buffer status metric and the at least one of the mobility metric and the radio quality metric.

This application layer metrics used in the prior art buffer control models are alone not enough to give timely decisions to prevent video freezes. They often trigger buffer status actions, such as downloading of video packets, late as the degradation in the application layer is detected much later in time than the degradation in quality on lower layers. The embodiments find out the root causes of low throughput, as the low throughput and the high delay might be caused by a high fluctuation of radio quality metrics, which might indeed be a result of high user mobility. Accordingly, using radio quality metrics and/or mobility metrics in the buffer control model enable triggering buffer status actions at a more appropriate point in time to thereby prevent or at least reduce the risk of video freezes.

BRIEF DESCRIPTION OF THE DRAWINGS

The embodiments, together with further objects and advantages thereof, may best be understood by making reference to the following description taken together with the accompanying drawings, in which:

FIG. 2 is a flow chart illustrating an embodiment of a method of controlling a video playback buffer;

FIG. 3 is a flow chart illustrating additional, optional steps of the method shown in FIG. 2 according to an embodiment;

FIG. 4 is a flow chart illustrating an additional, optional step of the method shown in FIG. 2 according to an embodiment;

FIG. 5 is a flow chart illustrating an additional, optional step of the method shown in FIG. 2 according to another embodiment;

FIG. 6 is a flow chart illustrating additional, optional steps of the method shown in FIG. 2 according to another embodiment;

FIG. 7 is a flow chart illustrating an embodiment of a method of determining a buffer control model;

FIG. 8 is a flow chart illustrating additional, optional steps of the method shown in FIG. 7 according to an embodiment;

FIG. 9 is a flow chart illustrating additional, optional steps of the method shown in FIG. 7 according to another embodiment;

FIG. 10 is a flow chart illustrating additional, optional steps of the method shown in FIG. 7 according to a further embodiment;

FIG. 11 is a flow chart illustrating an additional, optional step of the method shown in FIG. 7 according to an embodiment;

FIG. 12 is a flow chart illustrating additional, optional steps of the method shown in FIG. 7 according to yet another embodiment;

FIG. 13 schematically illustrates a user case in a mobile context based on data measured by an ANDROID® smartphone;

FIG. 20 is a schematic block diagram of a device for controlling buffer status according to yet another embodiment;

FIG. 21 is a schematic block diagram of a device for determining buffer control model according to yet another embodiment;

FIG. 22 is a schematic block diagram of a user device according to an embodiment;

DETAILED DESCRIPTION

Throughout the drawings, the same reference numbers are used for similar or corresponding elements.

The present embodiments generally relate to video playback buffer control, and in particular to methods, devices and computer programs for controlling a video playback buffer and for determining a buffer control model.

The prior art buffer control mechanisms that are employed for video playback buffers, also denoted jitter buffers in the art, mainly use, as mentioned in the background section, application layer metrics, i.e. metrics obtained by measurements conducted in the application layer of the Open System Interconnection (OSI) protocol stack. However, such an approach often triggers combating actions, such as triggering download of more video packets, too late as the degradation in the application layer is detected much later in time than the degradation of quality on lower layers, such as the network or radio layer.

Thus, in order for the buffer control mechanism to give timely decisions, particularly with regard to the timing of downloading video packets, it is important to find out the root cause(s) of low throughput since the low throughput and the high delay might be caused by high fluctuation of radio quality metrics and/or be a result of high user mobility. This means that replacing or complementing the high level metrics, such as application layer metrics, by or with radio and user context information enables monitoring of patterns in the radio link state as well as the user context, such as location and mobility. Then, the buffer control mechanism can make more appropriate decisions, in particular with regard to the timing of the decision, to reduce the risk of depleting the video playback buffer and thereby reducing the risk of freezes.

Figure 1:
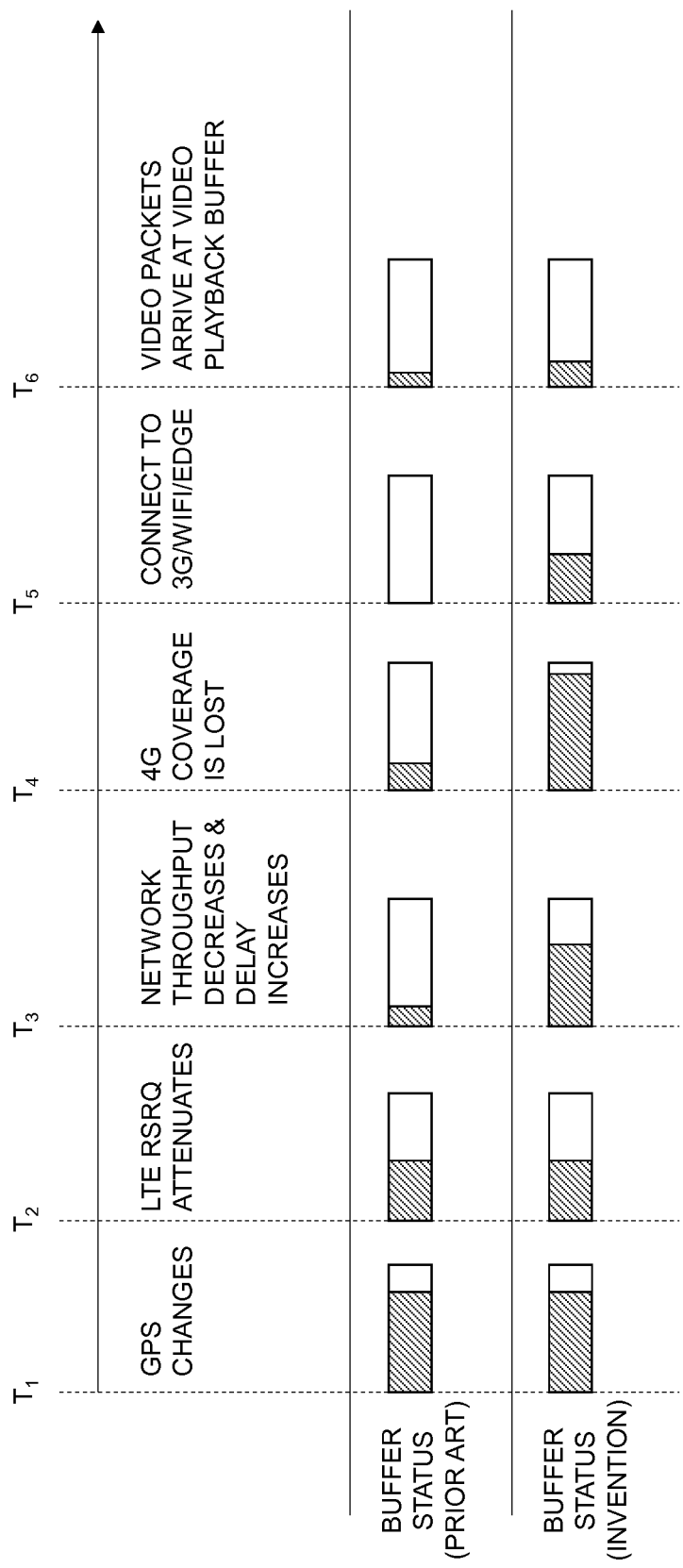
FIG. 1 schematically illustrate a timeline for a video stall or freeze in mobile context illustrating buffer status according to prior art and according to an embodiment.

FIG. 1 schematically illustrates a timeline for a video stall or freeze in mobile context illustrating buffer status of a video playback buffer according to prior art and according to an embodiment. At time $T_1$ a change in position of a user device is detected, such as a change in Global Positioning System (GPS) coordinates, thereby indicating mobility of the user device. At time $T_2$ an attenuation in Long Term Evolution (LTE) Reference Signal Received Quality (RSRQ), a radio quality metric, is detected. At time $T_3$ the network throughput decreases, thereby increasing the delay in transmission of video packets to the user device. As a consequence of the LTE RSRQ attenuation and decrease in network throughput, the throughput of video packets to the user devices reduces, thereby causing a reduction in the amount of video packets present in the video playback buffer according to the prior art. At time $T_4$ the LTE (4G) coverage is completely lost and the user device disconnects from the Internet network. At time $T_5$ the user device connects to another Radio Access Technology (RAT), represented by 3G, WiFi or Enhanced Data rates for GSM Evolution (EDGE) in the figure. This RAT change causes a change in Internet Protocol (IP) address for the delivery of video packets to the user device. At time $T_6$ video packets start to arrive at the user device and the video playback buffer using the connected RAT and new IP address.

According to the prior art technology, any change in throughput affecting the buffer status of the video playback buffer is first detectable at time $T_3$. The buffer control mechanism could then initiate re-buffering and reduce the consumption bitrate to try to mitigate or combat the reduction in network throughput. However, due to the need for a change in RAT and IP address, no new video packets will arrive at the video playback buffer according to the prior art from time $T_4$ up to time $T_6$. As a consequence, the video stalls and freezes between time $T_5$ when the video playback buffer is completely depleted and time $T_6$ when new video packets start to arrive.

In order to avoid emptying the video playback buffer and to avoid the stalling event, the handover duration, i.e. $T_5$-$T_4$, should be less than $\Delta T_{timeToempty}$, the time it takes for the video playback buffer to become empty after $T_4$, i.e.

$$\Delta T_{handover} = T_5 - T_4 < \frac{\text{BufferSize}}{\text{Bitrate}} = \Delta T_{timeToempty}.$$

The embodiment illustrated at the lower part of FIG. 1 in clear contrast performs a buffer control mechanisms based on a mobility metric representing a mobility pattern of the user device and/or a radio quality metric. This means that a change in position of the user device can be detected already at time $T_1$ and a change in radio quality can be detected already at time $T_2$, i.e. well in advance to the prior art that in clear contrast performs a detection of a change in throughput at time $T_3$. This means that the buffer control mechanism of the invention can take buffer status actions already at time $T_1$ to $T_2$, such as initiating re-buffering and reducing consumption bitrate. These buffer status actions imply that the video playback buffer start to fill up at time $T_3$, whereas according to the prior art the video playback buffer is emptied. The present invention thereby allows the video playback buffer to contain sufficient amount of video packets to handle the LTE coverage lost and RAT switch from time $T_4$ to time $T_6$ without completely depleting the video playback buffer. This means that no video freeze occurs according to the invention. This is possible by basing the buffer control mechanism on the mobility metric and/or radio quality metric, changes of which can be detected at much earlier points in time as compared to detecting changes in application layer metrics as is done according to the prior art.

FIG. 2 is a flow chart illustrating a method of controlling a video playback buffer in a user device according to an embodiment. The method comprises determining, in step S1, a buffer status metric representing a current amount of video packets in the video playback buffer. A next step S2 comprises triggering a buffer status action based on the buffer status metric and at least one of a mobility metric representing a mobility pattern of the user device and a radio quality metric representing a signal strength of a radio channel carrying video packets towards the user device.

Thus, according to the embodiment shown in FIG. 2, a buffer status action is triggered based both on the buffer status metric as determined in step S1 and at least one additional metric representing the mobility pattern of the user device, i.e. the mobility metric, or representing the signal strength or radio quality, i.e. the radio quality metric.

The buffer status action is, which is further described herein, an action that is triggered in order to reduce the risk of depleting the video playback buffer, also referred to as jitter buffer in the art. The trigger of the embodiments being based on not only the current amount of video packets in the video playback buffer but also the mobility metric and/or radio quality metric can thereby be initiated at an earlier point in time as compared to prior art techniques that do not use such mobility or radio quality metrics, see FIG. 1.

In an embodiment, step S1 of FIG. 2 comprises determining a buffer status metric representing at least one of a current number of bytes of video packets in the video playback buffer and a ratio between the current amount of video packets in the video playback buffer and a maximum size of the video playback buffer.

Thus, the current amount of video packets in the video playback buffer is in an embodiment expressed as the number of bytes, bits or indeed some other quantity, of video packets or video data currently present in the video playback buffer. In another embodiment, the current amount of video packets is expressed as a ratio between the current amount of video packets in the video playback buffer and a current maximum size of the video playback buffer. In the first embodiment, the results is a number of, for instance, bytes. In the latter embodiment, the result is a value between 0 and 1 or 100 (0 indicates empty video playback buffer and 1 or 100 indicates a full video playback buffer). Please note that the maximum size of the video playback buffer does not necessarily have to be fixed but could be changed by the buffer control mechanism or model. Hence, the maximum size used in the latter embodiment is preferably a currently used maximum size of the video playback buffer.

In an embodiment, step S2 of FIG. 2 comprises triggering the buffer status action based on the buffer status metric and based on the mobility metric. In another embodiment, step S2 comprises triggering the buffer status action based on the buffer status metric and based on the radio quality metric. In these two embodiments, one of the mobility metric and the radio quality metric is used together with the buffer status metric. In a further embodiment, step S2 comprises triggering the buffer status action based on the buffer status metric, the mobility metric and the radio quality metric. In this embodiment, both the mobility metric and the radio quality metric are thereby used together with the buffer status metric.

In an embodiment, the radio quality metric is a radio quality metric measured at a Radio Interface Layer (RIL) providing an interface between an operating system (OS) of the user device and a radio hardware of the user device.

Thus, a RIL is a layer in an OS which provides an interface to the hardware's radio and modem on e.g. a mobile phone, smartphone or other user devices with radio communication capabilities.

For instance, the RIL of ANDROID® capable user devices typically comprises a stack of two components: a RIL Daemon and a Vendor RIL. The RIL Daemon talks to the telephony services and dispatches "solicited commands" to the Vendor RIL. The Vendor RIL is specific to a particular radio implementation, and dispatches "unsolicited commands" up to the RIL Daemon.

In an embodiment, the radio quality metric is selected from at least one of a reference signals received power (RSRP) metric, a reference signals received quality (RSRQ) metric, a 3G signal strength metric, a 2G signal strength metric and a local area wireless signal strength metric.

RSRP and RSRQ are two radio quality metrics representing received power level and received quality (signal-to-noise ratio, SNR), respectively. These radio quality metrics are used in LTE/4G networks in order to represent the signal strength and quality of radio channels between access points, typically evolved Node-Bs (eNBs), and user devices. The 3G and 2G signal strength metrics are corresponding radio quality metrics but as used in 3G and 2G networks, respectively. The local area wireless signal strength metric is a radio quality metric as used in WiFi networks and local area networks (LANs).

These type of radio quality metrics could, in an embodiment, be determined on both cellular and WiFi network interfaces, such as measured as raw in the user device. The raw quality data could then be 3GPP signal strength (dBm), e.g. RSRP, RSRQ, 3G signal strength, 2G signal strength, and WiFi signal strength (dBm).

FIG. 3 is a flow chart illustrating additional, optional steps of the method shown in FIG. 2. The method continues from step S1 in FIG. 2. A next step S10 comprises determining, for a measurement time window encompassing multiple measurement instances, multiple radio quality metrics selected among average signal quality, standard deviation of signal quality, minimum signal quality, maximum signal quality, number of decreases in signal quality at the multiple measurement instances, number of increases in signal quality at the multiple measurement instances and number of measurement instances with no change in signal strength among the multiple measurement instances. The method then continues to step S2 in FIG. 2, or to step S11 in FIG. 3. In this embodiment, step S2 comprises triggering the buffer status action based on the buffer status metric and the multiple radio quality metrics and optionally the mobility metric.

In this embodiment, a measurement time window of multiple discrete measurement instances is employed in order to determine multiple radio quality metrics. This means that at each of the measurement instances a measurement or at least an estimation of the relevant signal strength, such as 3GPP signal strength and/or WiFi signal strength, is made, preferably at the RIL in the user device.

The average signal quality is then the mean or average of the measurements at the multiple measurement instances and the standard deviation is the standard deviation calculated for the measurements at the multiple measurement instances. The minimum/maximum signal quality is the lowest/highest signal quality as measured within the measurement time window. The other three radio quality metrics mentioned in the foregoing compares the signal quality measured at time instance $t_n$ with the signal quality measured at the previous time instance $t_{n-1}$. If the signal quality has decreased with at least a predefined minimum amount from $t_{n-1}$ to $t_n$ then the metric number of decreases in signal quality is increased by one. Correspondingly, if the signal quality increases with at least a predefined minimum amount from $t_{n-1}$ to $t_n$ then the metric number of increases in signal quality is increased by one. Finally, if the signal qualities as measured at the two consecutive measurement instances $t_{n-1}$ and $t_n$ are substantially the same, i.e. $SQ_n = SQ_{n-1} \pm \Delta$, wherein $SG_{n/n-1}$ denotes the signal quality as measured at $t_{n/n-1}$ and $\Delta$ is a predefined delta signal quality value, then the metric number of measurement instances with no change in signal strength is increased by one.

In an embodiment, multiple, i.e. at least two, of the above listed radio quality metrics are determined. In a particular embodiment, all of the above mentioned radio quality metrics or at least a major portion thereof are determined for the measurement time window. In such a case, these multiple radio quality metrics are used together with the buffer status metric and optionally the mobility metric in step S2 of FIG. 2.

The multiple radio quality metrics determined in step S10 are preferably determined for at least the RAT and network to which the user device is currently connected. Thus, the multiple radio quality metrics could be average RSRP/RSRQ/3G signal strength/2G signal strength/WiFi signal strength, standard deviation of RSRP/RSRQ/3G signal strength/2G signal strength/WiFi signal strength, maximum RSRP/RSRQ/3G signal strength/2G signal strength/WiFi signal strength, and so on. It is also possible, depending on the capabilities of the user device, to perform signal strength measurements also for other RATs and networks available at the current position of the user device but which the user device not necessarily is currently connected to. For instance, the multiple radio quality metrics could, for instance, include average RSRP or RSRQ and average 3G signal strength, etc. in the case there are both an available LTE/4G network and a 3G network present.

In an embodiment, the mobility metric is selected from at least one of number of handovers within a measurement time window comprising multiple measurement instances and position data representing a position of the user device at the multiple measurement instances.

The number of handovers between any RAT or network technology could be determined based on raw metrics, such as determined at the RIL of the user device. For instance, information of cell identifiers and WiFi access point names can be used to determine the number of handovers within cellular networks and LANs, respectively. Further information include active interface IP addresses, such as the cellular IP and WiFi IP addresses. Also information of the active network technology could be used to determine the number of handovers.

For instance, the RIL is used by the OS specific application programming interface (API). RIL helps determining the mobility as well as support from the IP detection. Accordingly, it is possible to capture cell identifier changes indirectly via RIL. The determination of mobility may be performed based on multiple components, such a combination of metrics obtained via RIL via telephony APIs and via network APIs to capture IP address changes.

The number of handovers could include information of the number of handovers within a current RAT, such as 4G to 4G handover, also denoted horizontal handovers, and/or information of the number of handovers between RATs and networks, such as 4G to 3G handover, also denoted vertical handovers.

4G/3G/2G to 4G/3G/2G handover can be detected as a change in cellular identifier but no change in cellular IP address and no change in the cellular network type. A WiFi to WiFi handover can be detected as a change in WiFi access point name but no change in WiFi IP address. A handover between 4G, 3G, 2G can be detected as a change in the cellular network type LTE for 4G, UMTS for 3G and EDGE for 2G, but no change in cellular IP address. A handover between 4G/3G/2G and WiFi can be detected as a change between cellular IP address and WiFi IP address and a change in network type.

In an embodiment, the number of handovers is determined for the measurement time window for each type of handover as mentioned above. This means if there are N available RATs or networks then $N(N+1)/2$ different number of handovers are determined. In another embodiment, a subset of such handovers are determined.

The position data generated as an embodiment of the mobility metric could be any position data that represents the position of the user device at the multiple measurements instances within the measurement time window. For instance, GPS coordinates determined by a GPS sensor in or connected to the user device could be used to determine the position of the user device. Also other technologies than GPS could be used to determine the position of the user device including satellite based systems, such as GLONASS, Galileo, etc.; local positioning systems (LPSs) including real-time locating systems; mobile phone tracking systems; etc.

In an embodiment, the position data employed as mobility metric defines the positions or coordinates at each of the multiple measurement instances. In such a case, the position data could include all these positions or coordinates. In an alternative embodiment, the position data could comprise an average position of the user device optionally in combination with a standard deviation of the determined positions or coordinates within the measurement time window.

In another embodiment, the position data includes information of the number of changes in the position of the user device within the measurement time window. For instance, the position of the user device at measurement instance $t_n$ could be compared to the position of the user device at measurement instance $t_{n-1}$. If the two positions differ from each other with at least a minimum amount then a counter representing the number of changes in the position of the user device within the measurement time window is increased by one. Thus, if $|P_n - P_{n-1}| > T$ then the counter is increased by one, wherein $P_{n/n-1}$ represents the position of the user device at measurement instance $t_{n/n-1}$ and T is defined threshold value. Alternatively, the longitude and latitude coordinates could be handled separately, possibly using two different counters to define the number of times the longitudinal and latitudinal coordinates of the user device changes within the measurement time window.

In an embodiment, the method comprises an additional, optional step S11 as shown in FIG. 3. This step S11 comprises determining, for the measurement time window, multiple mobility metrics selected among number of verticals handovers between radio access networks of different radio access technologies, number of horizontal handovers between radio access points of a same radio access technology and number of changes in position of the user device. The method then continues to step S2 in FIG. 2, which in this embodiment comprises triggering the buffer status action based on the buffer status metric and the multiple mobility metrics and optionally the radio quality metric.

In another embodiment, the method comprises both steps S10 and S11 described above. In such a case, step S2 of FIG. 2 preferably comprises triggering the buffer status action based on the buffer status metric determined in step S1, the multiple radio quality metrics determined in step S10 and the multiple mobility metrics determined in step S11.

The novel metrics used in deciding or selecting whether to trigger a buffer status action according to the embodiments, i.e. the radio quality metrics and/or the mobility metrics, could be used, together with the buffer status metric as the sole metric(s) in step S2 of FIG. 2. Alternatively, also other metrics traditionally employed in buffer control mechanisms, such as the previously mentioned application layer metrics, could also be used in step S2. In such case, step S2 comprises triggering the buffer status action based on the buffer status metric, at least one of the mobility metric and the radio quality metric, and at least one additional metric, such as at least one application layer metric, for instance a delay metric representing the time interval between arrivals of video packets at the video playback buffer and/or a throughput metric representing the amount of video packets arrived at the video playback buffer during a given period of time.

In an embodiment, the user device is a mobile handheld device comprising at least one API. In such a case, the method comprises an additional, optional step as shown in FIG. 4. The method continues from step S1 in FIG. 2 to step S20, which comprises the at least one API determines the at least one of the mobility metric and the radio quality metric.

In this embodiment, the user device itself determines the mobility metric(s) and/or radio quality metric(s), preferably by using at least one API implemented in the user device. The at least one API could then be configured to retrieve raw data from the RIL(s) in order to determine the mobility metric(s) and/or radio quality metric(s).

An API expresses a software component in terms of its operations, inputs, outputs, and underlying types, defining functionalities that are independent of their respective implementations, which allows definitions and implementations to vary without compromising the interface. The API can then interact with hardware and software components of the user device in order to retrieve necessary data therefrom.

Also other implementation embodiments are possible that do not necessarily depend on the usage of APIs and in which the user device itself determines the mobility metric(s) and/or radio quality metric(s). Further embodiments include that at least one of these metrics is determined by an entity or device external and different from the user device. For instance, a radio base station, such as eNB, in a cellular communication network could determine or at least estimate the signal strength of the radio channel carrying video packets towards the user device. The radio base station could then transmit information of the determined or estimated signal strength to the user device to thereby be used to derive the radio quality metric and triggering the buffer status action. Furthermore, position data of the user device could be determined by radio base stations or access points in a radio-based communication network, such as using triangulation techniques. In such a case, the position data could be transmitted from a radio base station or access point to the user device and thereby be used to derive the mobility metric and triggering the buffer status action.

Thus, embodiments as described herein involve the user device determining the necessary metrics used in step S2 by itself, at least one external device determines the necessary metrics used by the user device in step S2 and at least one of the necessary metrics is determined by at least one external device and at least one of the necessary metrics is determined by the user device.

FIG. 5 is a flow chart illustrating an additional, optional step of the method shown in FIG. 2. The method continues from step S1 in FIG. 2 and continues to step S30. This step S30 comprises selecting the buffer status action from a set of multiple available buffer status actions based on the buffer status metric and the at least one of the mobility metric and the radio quality metric. The method is then continued to step S2, where the selected buffer status action is triggered at the user device.

Thus, in this embodiment there are multiple available buffer status actions to select among. The most appropriate buffer status action for the current situation as defined by the buffer status metric and the mobility metric and/or radio quality metric is then selected based on the particular values of these metrics.

FIG. 6 is a flow chart illustrating a particular embodiment of step S30. In this particular embodiment, step S31 comprises inputting the buffer status metric and the at least one of the mobility metric and the radio quality metric into a buffer control model. A next step S32 comprises receiving, from the buffer control model, a candidate set of at least one buffer status action among the multiple available buffer status actions that is predicted by the buffer control model to achieve a defined video playback buffer status result. The following step S33 comprises selecting a buffer status action from the candidate set of at least one buffer status action. The method then continues to step S2 in FIG. 2, in which the selected buffer status action is triggered.

In this embodiment, a buffer status model is employed to output a candidate set of at least one buffer status action based on input metrics. The buffer status model is preferably a machine learning (ML) model that has been trained to select suitable buffer status actions depending on various conditions and contexts of user devices as represented by the input metrics. The buffer status model thereby outputs a candidate set of at least one buffer status action among the multiple available buffer status actions that is predicted by the buffer control model to achieve a defined video playback buffer status result.

The status result could, for instance, be preventing emptying or depleting the video playback buffer. Another status result could be keeping the amount of video packets in the video playback buffer at least equal to or above a defined minimum amount. Hence, in this latter case the amount of video packets in the video playback buffer preferably never falls below the defined minimum amount.

The buffer control model could be implemented in the user device, such as forming part of a device for controlling the video playback buffer in the user device. In such a case, the user device receives the candidate set of at least one buffer status action as output from the buffer control model in step S32. In another embodiment, the buffer control model is implemented outside of the user device, such as in a device implemented in a radio base station or access point in a radio-based communication network or in a device wirelessly connected or connected by wire to such a radio base station or access point. In such a case, the user device preferably transmits the relevant metrics to the external device with the buffer control model. The information of the output candidate set of at least one buffer status action is then transmitted from the external device to the user device, which receives the candidate in step S32 from the remote device.

The candidate set predicted by the buffer control model based on the input metrics to achieve the defined video playback buffer status result could include a single buffer status action that is predicted to be the most optimal one among the multiple available buffer status actions. In such a case, this single buffer status action will be used and triggered. In another embodiment, the candidate set comprises more than one buffer status action but, preferably, a subset of the multiple available buffer status actions. In such a case, if there are M≥2 available buffer status actions then the candidate set comprises at most M−1 buffer status actions.

In an embodiment, step S2 of FIG. 2 comprises triggering a re-buffering of video packets in the video playback buffer based on the buffer status metric and the at least one of the mobility metric and the radio quality metric.

Thus, the preferably selected buffer status action is in this embodiment a re-buffering of video packets. This buffer status action could define, for instance, re-buffering X bytes of video packets or video data at the video playback buffer. This means that the amount of video packets present in the video playback buffer will increase by X bytes due to this buffer status action.

In another embodiment, step S2 of FIG. 2 comprises triggering an increase in a maximum size of the video playback buffer based on the buffer status metric and the at least one of the mobility metric and the radio quality metric.

Thus, the preferably selected buffer status action is in this embodiment an increase in the maximum size of the video playback buffer. This buffer status action could define, for instance, increasing the maximum size of the video playback buffer with Y bytes. An increase in the maximum size means that more video packets can be stored in the video playback buffer, thereby resulting in more video data present in the video playback buffer.

In a further embodiment, step S2 of FIG. 2 comprises triggering a reduction in playback bitrate of video data from the video playback buffer based on the buffer status metric and the at least one of the mobility metric and the radio quality metric.

Thus, the preferably selected buffer status action is in this embodiment a reduction in the playback bitrate of video data. This can, for instance, be achieved by reducing the playback bitrate to one of the available bitrates in the streaming server that provides the video data for transmission to the user device. A reduction in playback bitrate implies a degradation in the spatial video quality during playback or play out of the video.

In yet another embodiment, step S2 of FIG. 2 comprises triggering a handover from a current radio access network to which the user device is currently connected to another radio access network based on the buffer status metric and the at least one of the mobility metric and the radio quality metric.

Thus, the preferably selected buffer status action is, in this embodiment, to switch the actively connected network interface by conducting a handover. As a result of such a handover, the radio signal strength of a radio channel carrying video packets to the user device may improve, thereby leading to reception of more video packets that can be entered in the video playback buffer. In an embodiment, this buffer status action could be defined as a handover to a WiFi network, a handover to a LTE/4G network or a handover to a 3G network.

The above presented different examples of buffer status actions constitute, in an embodiment, the multiple available buffer status actions. Hence, in an embodiment, the multiple available buffer status actions comprise a re-buffering of video packets, an increase in maximum size of the video playback buffer, a reduction in playback bitrate and a handover. In other embodiments, the multiple available buffer status actions comprise 1) re-buffering of video packets and an increase in maximum size of the video playback buffer, 2) re-buffering of video packets and a reduction in playback bitrate, 3) re-buffering of video packets and a handover, 4) an increase in maximum size of the video playback buffer and a reduction in playback bitrate, 5) an increase in maximum size of the video playback buffer and a handover, 6) a reduction in playback bitrate and a handover, 7) a re-buffering of video packets, an increase in maximum size of the video playback buffer and a reduction in playback bitrate, 8) a re-buffering of video packets, an increase in maximum size of the video playback buffer and a handover, or 9) an increase in maximum size of the video playback buffer, a reduction in playback bitrate and a handover.

FIG. 7 is a flow chart illustrating a method of determining a buffer control model. The method comprises inputting, in step S40 and during a training phase and into a ML model, a training set. The training set comprises a buffer status metric representing a current amount of video packets in a video playback buffer. The training set also comprises at least one of a mobility metric representing a mobility pattern of a user device comprising the video playback buffer and a radio quality metric representing a signal strength of a radio channel carrying video packets towards the user device. The training set further comprises a buffer status action triggered to achieve a video playback buffer status result and a label indicating whether the buffer status action successfully achieved the video playback buffer status result or not. The method also comprises repeating, during the training phase, step S40 with different training sets to train the ML model into the buffer control model configured to output a candidate set of at least one buffer status action predicted by the buffer control model to achieve a defined video playback buffer status result based on a buffer status metric and at least one of a mobility metric and a radio quality metric.

The method as shown in FIG. 7 thereby determines a buffer control model that can be used as previously described herein, such as in connection with FIG. 6, in order to provide suitable buffer status action(s) that can be used by a user device in order to achieve a defined video playback buffer status result based on metrics input to the buffer control model.

In the training phase, a ML model is trained with multiple different training sets defining input metrics, a selected buffer status action and a label indicating whether the buffer status action successfully achieved a target status result for the video playback buffer.

This means that such a training set is input in step S40 to the ML model. The method then continues to the optional step S42, which investigates if there are more training sets to use during the training set. If yes, the method continues to step S40, in which the new training set consisting of another combination of the metrics, buffer status action and label is input to the ML model, which is schematically illustrated by the line L1. Thus, the loop of steps S40 and S42 is performed for each available training set during the training phase. Once all training sets have been input to the ML model, the training phase preferably ends and the result is the buffer control model that can be used to control the buffer status of a video playback buffer based on input metrics according to the embodiments.

FIG. 8 is a flow chart illustrating additional, optional steps of the method shown in FIG. 7. In an embodiment the method starts at step S50. This step S50 comprises determining, at each measurement instance among multiple measurement instances within a measurement time window, at least one of a current number of bytes of video packets in the video playback buffer and a ratio between the current amount of video packets in the video playback buffer and a maximum size of the video playback buffer. A next step S51 comprises determining, for the measurement time window, multiple buffer status metrics. In an embodiment, the multiple buffer status metrics are selected among i) average number of bytes of video packets in the video playback buffer, ii) average ratio between the current amount of video packets in the video playback buffer and the maximum size of the video playback buffer, iii) standard deviation of number of bytes of video packets in the video playback buffer, iv) standard deviation of the ratio between the current amount of video packets in the video playback buffer and the maximum size of the video playback buffer, v) minimum number of bytes of video packets in the video playback buffer, vi) minimum ratio between the current amount of video packets in the video playback buffer and the maximum size of the video playback buffer, vii) maximum of bytes of video packets in the video playback buffer, viii) maximum ratio between the current amount of video packets in the video playback buffer and the maximum size of the video playback buffer, ix) number of increases in bytes of video packets in the video playback buffer at the multiple measurement instances, x) number of increases in the ratio between the current amount of video packets in the video playback buffer and the maximum size of the video playback buffer at the multiple measurement instances, xi) number of decreases in bytes of video packets in the video playback buffer at the multiple measurement instances, xii) number of decreases in the ratio between the current amount of video packets in the video playback buffer and the maximum size of the video playback buffer at the multiple measurement instances, xiii) number of measurement instances with no change in bytes of video packets in the video playback buffer among the multiple measurement instances, and xiv) number of measurement instances with no change in the ratio between the current amount of video packets in the video playback buffer and the maximum size of the video playback buffer among the multiple measurement instances. In such a case, the training set comprises the multiple buffer status metrics, the at least one of the mobility metric and the radio quality metric, the buffer status action and the label.

The multiple buffer status metrics of the training set could include all 14 buffer status metrics listed above (i) to xiv)). Alternatively, the training set comprises 2, 3, 4, 5, 6, 7, 8, 9, 10, 11, 12 or 13 of the 14 buffer status metrics listed above.

The method then continues to step S40, in which the training set is input to the ML model.

In an embodiment, the method as shown in FIG. 7 or FIG. 8 comprises the additional, optional step as shown in FIG. 9. These steps comprise determining, in step S52 and at each measurement instance among multiple measurement instances within a measurement time window, at least one signal quality representation of a RSRP, a RSRQ, a 3G signal strength, a 2G signal strength and a local area wireless signal strength. The steps also comprise determining, in step S53 and for the measurement time window, multiple radio quality metrics. The multiple radio quality metrics are preferably selected among i) average signal quality, ii) standard deviation of signal quality, iii) minimum signal quality, iv) maximum signal quality, v) number of decreases in signal quality at the multiple measurement instances, vi) number of increases in signal quality at the multiple measurement instances, and vii) number of measurement instances with no change in signal strength among the multiple measurement instances. In such a case, the training set comprises the buffer status metric, the multiple radio quality metrics, optionally the mobility metric, the buffer status action and the label.

The multiple radio quality metrics of the training set could include all seven radio quality metrics listed above (i) to vii)). Alternatively, the training set comprises 2, 3, 4, 5 or 6 of the 7 radio quality metrics listed above. In an embodiment, one or more such radio quality metrics are determined in step S53 for each available signal quality representation, i.e. for each of RSRP, RSRG, 3G signal strength, optionally 2G signal strength, and local area wireless signal strength. If all five of these signal quality representations are available it means that up to 35 radio quality metrics are determined in step S53.

In an embodiment, the method as shown in FIG. 7, FIG. 8 or FIG. 9 comprises the additional, optional step as shown in FIG. 10. These steps comprise determining, in step S54 and at each measurement instance among multiple measurement instances within a measurement time window, least one of number of handovers and position data representing a position of the user device. These steps also comprise determining, in step S55 and for the measurement time window, multiple mobility metrics. These multiple mobility metrics are preferably selected among i) number of verticals handovers between radio access networks of different radio access technologies, ii) number of horizontal handovers between radio access points of a same radio access technology, and iii) number of changes in position of the user device. In such a case, the training set comprises the buffer status metric, the multiple mobility metrics, optionally the radio quality metric, the buffer status action and the label.

The multiple mobility metrics of the training set could include all three mobility metrics listed above (i) to iii)). Alternatively, the training set comprises two mobility metrics listed above. If the available radio access networks include LTE/4G, 3G, 2G and WiFi networks then the mobility metric i) could include up to 12 mobility metrics (4G-to-3G, 3G-to-4G, 4G-to-2G, 2G-to-4G, 4G-to-WiFi, WiFi-to-4G, 3G-to-2G, 2G-to-3G, 3G-to-WiFi, WiFi-to-3G, 2G-to-WiFi and WiFi-to-2G handovers). Correspondingly, the mobility metric ii) could include up to four mobility metrics (4G-to-4G, 3G-to-3G, 2G-to-2G and WiFi-to-WiFi handover). The radio quality metric iii) could be in the form of two radio quality metrics one representing the number of changes in longitudinal coordinates of the user device and another representing the number of changes in latitudinal coordinates of the user device.

The embodiments mentioned above and disclosed in FIGS. 8 to 10 can be combined in any way. Thus the training set could comprise a buffer status metric, a mobility metric, the buffer status action and the label; a buffer status metric, a radio quality metric, the buffer status action and the label; a buffer status metric, a radio quality metric, a mobility metric, the buffer status action and the label; multiple buffer status metrics, a mobility metric, the buffer status action and the label; multiple buffer status metrics, a radio quality metric, the buffer status action and the label; multiple buffer status metrics, a radio quality metric, a mobility metric, the buffer status action and the label; a buffer status metric, multiple mobility metrics, the buffer status action and the label; a buffer status metric, multiple mobility metrics, a radio quality metric, the buffer status action and the label; a buffer status metric, multiple radio quality metrics, the buffer status action and the label; a buffer status metric, a mobility metric, multiple radio quality metrics, the buffer status action and the label; multiple buffer status metrics, multiple mobility metrics, the buffer status action and the label; multiple buffer status metrics, multiple mobility metrics, a radio quality metric, the buffer status action and the label; multiple buffer status metrics, multiple radio quality metrics, the buffer status action and the label; multiple buffer status metrics, a mobility metric, multiple radio quality metrics, the buffer status action and the label; a buffer status metric, multiple mobility metrics, multiple radio quality metrics, the buffer status action and the label; or multiple buffer status metrics, multiple radio quality metrics, multiple radio quality metrics, the buffer status action and the label.

In an embodiment, step S40 comprises inputting, during the training phase and into the ML model, a training set comprising the buffer status metric, the at least one of the mobility metric and the radio quality metric, a buffer status action triggered to prevent depletion of the video playback buffer, and a label indicating whether the buffer status action successfully prevented depletion of the video playback buffer or not.

Thus, in this embodiment the video playback buffer status result is prevention of depleting the video playback buffer. In another embodiment, the video playback buffer status result is preventing a reduction of the amount of video data or video packets in the video playback buffer below a threshold value. This embodiment could thereby set a higher threshold value than zero.

In an embodiment, step S40 comprises inputting, during the training phase and into the ML model, a training set comprising the buffer status metric, the at least one of the mobility metric and the radio quality metric, a buffer status action selected among a group consisting of a re-buffering of video packets in the video playback buffer, an increase in a maximum size of the video playback buffer, a reduction in playback bitrate of video data from the video playback buffer, and a handover from a current radio access network to which the user device is currently connected to another radio access network, and the label.

The above mentioned preferred buffer status actions have previously been described herein in connection with FIGS. 5 and 6.

FIG. 11 illustrates an additional, optional step of the method shown in FIG. 7. This step S41 comprises inputting, during the training phase and into the ML model, a user preference indicating whether a user has preference for the buffer status action or not. In this embodiment, the training set comprises an additional parameter in the form of the user preference or this user preference is input to the ML model in addition to the training set. The user preference could be a single yes or no, or $1_{bin}$ or $0_{ban}$, to signal whether a user prefers the buffer status action of the present training set.

Also more than two values could be used for the user preference, such as grading among more than two grades, e.g. low, medium or high preference, etc.

For instance, a user might prefer buffer status actions that do not lead to any deterioration or reduction in the video quality and thereby not prefer video quality lowering buffer status actions, such as reduction in the playback bitrate.

The user preference can thereby be used by the ML model to differentiate between at least two buffer status actions that both, given a combination of input metrics, are predicted to successfully achieve the video playback buffer status result. In such a case, the buffer status action among the at least two buffer status actions that was most preferred according to the user preference is preferably selected as the most appropriate buffer status action given the combination of input metrics.

FIG. 12 is a flow chart illustrating additional steps performed during an actuation phase, i.e. during the use of the determined buffer status model. The method comprises inputting, in step S50 and during an actuation phase and into the buffer control mode, a metric set comprising a buffer status metric representing a current amount of video packets in the video playback buffer and at least one of a mobility metric representing a mobility pattern of the user device and a radio quality metric representing a signal strength of a radio channel carrying video packets towards the user device. A next step S51 comprises receiving, during the actuation phase and from the buffer control model, a candidate set of at least one buffer status action predicted by the buffer control model to achieve a defined video playback buffer status result based on the buffer status metric and the at least one of the mobility metric and the radio quality metric. The following step S52 comprises triggering a buffer status action from the candidate set. A next step S53 comprises determining whether the defined video playback buffer status result was successfully achieved or not following triggering the buffer status action. The following step S54 comprises inputting, during the actuation phase and into the buffer control model, a training set comprising the buffer status metric input in step S50, the at least one of the mobility metric and the radio quality metric input in the step S50, the buffer status action triggered in step S52 and a label indicating whether the defined video playback buffer status result was successfully achieved or not as determined in step S53.

In an embodiment, step S54 comprises inputting, during the actuation phase and into the buffer control model, a training set comprising the buffer status metric input in step S50, the at least one of the mobility metric and the radio quality metric input in the step S50, the buffer status action triggered in step S52, the label indicating whether the defined video playback buffer status result was successfully achieved or not as determined in step S53 and a user preference indicating whether a user has preference for the buffer status action triggered in step S52 or not.

The above described embodiments involve updating or training the buffer control model during actual usage, i.e. during the actuation phase. Thus, steps S50 to S52 basically correspond to the procedure previously described herein in combination with FIGS. 2 and 6 that is performed to trigger a suitable buffer status action at the user device based on input metrics. The additional step S53 then verifies or determines whether the defined video playback buffer status result was successfully achieved or not, such as whether the video playback buffer was not depleted or the video playback buffer level did not fall below a threshold value. The metrics and information of the triggered buffer status action, the label and optionally the user preference is then input as a training set to the buffer control model to further train it during the actuation phase.

This embodiment thereby allows a further training and improvement of the buffer control model as determined according to FIG. 7. The further training of the buffer control model can take place at the user device or at an external device, depending on the processing and/or power capabilities of the user device. In the latter case, the user device preferably transmits information of the parameters of the training set to be input into the buffer control model in step S54 to the external device that performs the training.

Alternative embodiments use a static buffer control model. Thus, once the training phase is completed in FIG. 7, the resulting buffer control model used at or for the user device without any further training during the actuation phase.

EXAMPLE—USER CASE

FIG. 13 schematically illustrates a user case in a mobile context based on data measured by an ANDROID® smartphone. In this scenario, the smartphone user is entering a metro tunnel at approximately 2 minutes, and is getting out of the tunnel at approximately 38 minutes. The LTE RSRQ value is gradually decreasing and increasing while the train is entering and exiting the tunnel, respectively. While entering the tunnel, the LTE RSRQ value gradually decreases, and the smartphone is moving out of the LTE coverage, thus a possible handover is expected. If the handover time takes long, the video playback buffer might starve and soon causing a video freeze.

The figure also shows the delay as measured in the application layer together with the GPS coordinates of the smartphone.

Thus, if a user is at a metro/bus station, he is likely waiting for a metro or is within a metro, and is probably to soon move. Then, it is likely that signal strength will fluctuate faster and attenuates, and there will be a risk of moving away from the current radio network technology coverage. If a user is streaming a particular video during waiting for commuting, the player can predict that there will be a high mobility. By combining the pattern of the radio signal quality metric, the video player can predict the probability for a handover, and start pre-downloading extra data to avoid any future freezes.

EXAMPLE—BUFFER CONTROL MODEL

A set of metrics are monitored on a mobile handheld device. The most of the required metrics are easily accessible via the available APIs provided on smartphones running, for instance, ANDROID® OS. With a combination of the below metrics monitored at particular frequencies, the state of the video playback buffer, i.e. whether the video will continue smooth playback or not, is predicted with ML algorithms in advance via the mobility and radio quality metrics. The result of the prediction can then be used as input to the video adaptivity mechanism, i.e. the buffer control model, in the video player and perform appropriate actions to avoid video freezes.

Features

The below features are sampled using the available API on a smartphone at every measurement instance, such as every second, during a measurement time window and then are summarized with appropriate aggregation functions within $T_{window}$ seconds long measurement time windows.

The aggregation functions include average (avg), standard deviation (std), minimum (min), maximum (max), and number of changes (N) from the previous value of each feature. The number of samples within the $T_{window}$ seconds measurement time window will be equal to T. The features are categorized as radio or channel quality, application buffer length, and mobility. These categories are described in details as follows.

Radio Quality Features

The radio quality on both cellular and WiFi network interfaces are measured as raw on the smartphone. The raw data in the scope of radio or channel quality is 3GPP signal strength (dBm), e.g. RSRP, RSRQ, 3G signal strength, 2G signal strength, and WiFi signal strength (dBm). The raw data is then aggregated within the measurement time windows in order to produce radio quality metrics as exemplified below.

Aggregated 4G RSRP Metrics avgRSRP, stdRSRP, minRSRP, maxRSRP, NdownwardsChangeRSRP, NupwardsChangeRSRP, NnoChangeRSRP are the average, standard deviation, minimum, maximum, number of downwards change, number of upwards change, number of no change of LTE signal strength RSRP values within the measurement time window for the LTE interface.

Let us assume the following features within the $T_{window}$ seconds long measurement time window: rsrp in a measurement time window (W): $Wn=\{rsrp_{t1}, rsrp_{t2}, rsrp_{tn}, \ldots rsrp_{T}\}$ If the rsrptn is higher than $rsrp_{tn-1}$, then the RSRP is increased and, thus, NupwardsChangeRSRP is incremented by one at measurement instance $t_n$. Else If the $rsrp_{tn}$ is less than $rsrp_{tn-1}$, then the RSRP is decreased and, thus, NdownwardsChangeRSRP is incremented by one at measurement instance $t_n$. Else, if the RSRP is unchanged in two consecutive measurement instances, i.e. $rsrp_{tn}$ is equal to $rsrpt_{n-1}$, then NnoChangeRSRP is incremented by one.

Aggregated 4G RSRQ Metrics avgRSRQ, stdRSRQ, minRSRQ, maxRSRQ, NdownwardsChangeRSRQ, NupwardsChangeRSRQ, NnoChangeRSRQ are the average, standard deviation, minimum, maximum, number of downwards change, number of upwards change, number of no change of LTE signal RSRQ values within the measurement time window for the LTE interface.

Aggregated 3G Signal Strength Metrics avg3GSignal, std3GSignal, min3GSignal, max3GSignal, NdownwardsChange3Gsignal, NupwardsChange3Gsignal, NnoChange3Gsignal are the average, standard deviation, minimum, maximum, number of downwards change, number of upwards change, number of no change of 3G signal quality values within the measurement time window for the 3G interface.

Aggregated 2G Signal Strength Metrics avg2GSignal, std2GSignal, min2GSignal, max2GSignal, NdownwardsChange2Gsignal, NupwardsChange2Gsignal, NnoChange2Gsignal are the average, standard deviation, minimum, maximum, number of downwards change, number of upwards change, number of no change of 2G signal quality values within the measurement time window for the 2G interface.

Aggregated WiFi Signal Strength Metrics avgWiFiSignal, stdWiFiSignal, minWiFiSignal, maxWiFiSignal, NdownwardsChangeWiFiSignal, NupwardsChangeWiFiSignal, NnoChangeWiFiSignal are the average, standard deviation, minimum, maximum, number of downwards change, number of upwards change, number of no change of WiFi signal quality values within the measurement time window for the WiFi interface.

Application Buffer Length Features

The following two features are recorded as raw every measurement instances on the smartphone: bytesInPlaybackBuffer, e.g. bytes of video packets in the playback buffer, percentageInPlaybackBuffer, the percentage of the video packets in the video playback buffer relative to the current maximum playback buffer size. Next, the application layer metrics relating to the buffer length are aggregated.

Aggregated bytesInPlaybackBuffer Metric avgBytesInPlaybackBuffer, stdBytesInPlaybackBuffer, minBytesInPlaybackBuffer maxBytesInPlaybackBuffer, NdownwardsChangeBytesInPlaybackBufferl, NupwardsChangeBytesInPlaybackBuffer, NnoChangeBytesInPlaybackBuffer are the average, standard deviation, minimum, maximum, number of downwards change, number of upwards change, number of no change of the video packets or data in the video playback buffer within the measurement time window.

Aggregated percentageInPlaybackBuffer Metric avgPercentageInPlaybackBuffer, stdPercentageInPlaybackBuffer, minPercentageInPlaybackBuffer maxPercentageInPlaybackBuffer, NdownwardsChangePercentageInPlaybackBuffer, NupwardsChangePercentageInPlaybackBuffer, NnoChangePercentageInPlaybackBuffer are the average, standard deviation, minimum, maximum, number of downwards change, number of upwards change, number of no change of the video packets or data percentage. The percentage is calculated as 100×video data/maximum video playback buffer length in the video playback buffer within the measurement time window.

Mobility Features

The mobility features include the number of handovers between any network technology. This is computed based on detected raw data by the smartphone. The detected raw data are cell id, WiFi access point name, active interface IP addresses, e.g. the cellular IP and WiFi IP addresses are obtained per interface and separately, and active network interface technology. The number of transitions, N, in between any active network technology as $N_{4Gto4G}$, $N_{3Gto3G}$, $N_{2Gto2G}$, $N_{WiFitoWiFi}$, $N_{4Gto3G}$, $N_{3Gto4G}$, $N_{4Gto2G}$, $N_{2Gto4G}$, $N_{2Gto3G}$, $N_{3Gto2G}$, $N_{4GtoWiFi}$, $N_{WiFito4G}$, $N_{WiFito3G}$, $N_{3GtoWiFi}$, $N_{2GtoWiFi}$, $N_{WiFito2G}$.

The computation of the above aggregated handover counts are preferably performed as shown below:

4G to 4G Handover Detection

Amongst any two consecutive measurement instances in the measurement time window, if the cellular IP has not changed and is not null, and if the cellular network type is not changed and if it is LTE, and if the cell id is changed, $N_{4Gto4G}$ is incremented.

3G to 3G Handover Detection

Amongst any two consecutive measurement instances in the measurement time window, if the cellular IP has not changed and is not null, and if the cellular network type is not changed and if it is UMTS, and if the cell id is changed, $N_{3Gto3G}$ is incremented.

2G to 2G Handover Detection

Amongst any two consecutive measurement instances in the measurement time window, if the cellular IP has not changed and is not null, and if the cellular network type is not changed and if it is EDGE, and if the cell id is changed, $N_{2Gto2G}$ is incremented.

WiFi to WiFi handover detection

Amongst any two consecutive measurement instances in the measurement time window, if the WiFi IP has not changed and is not null, and if the connected WiFi access point name is changed, $N_{WiFitoWiFi}$ is incremented.

3G to 4G or 4G to 3G Handover Detection

Amongst any two consecutive measurement instances in the measurement time window, if the cellular IP is not null, and if the cellular network type has changed from UMTS to LTE, then $N_{3Gto4G}$ is incremented. If the network type is changed from LTE to UMTS, then $N_{4Gto3G}$ is incremented.

2G to 4G or 4G to 2G Handover Detection

Amongst any two consecutive measurement instances in the measurement time window, if the cellular IP is not null, and if the cellular network type is changed and if cellular network type is changed from EDGE to LTE, then $N_{2Gto4G}$ is incremented. If the cellular network type is changed from LTE to EDGE, then $N_{4Gto2G}$ is incremented.

3G to 4G or 4G to 3G Handover Detection

Amongst any two consecutive measurement instances in the measurement time window, if the cellular IP is not null, and if the cellular network type is changed from UMTS to LTE, then $N_{3Gto4G}$ is incremented.

If the cellular network type is changed from LTE to UMTS, then $N_{4Gto3G}$ is incremented.

WiFi to 4G or 4G to WiFi Handover Detection

Amongst any two consecutive measurement instances in the measurement time window, if the WiFi IP for the first measurement instance is not null, and the cellular IP is null, and if the WiFi IP for the second measurement instance is null, and the cellular IP is not null, and if the cellular network type for the second measurement instance is LTE, then $N_{WiFiTo4G}$ is incremented. If it is wise-versa, the $N_{4GTowifi}$ is incremented.

WiFi to 3G or 3G to WiFi Handover Detection

Amongst any two consecutive measurement instances in the measurement time window, if the WiFi IP for the first measurement instance is not null, and the cellular IP is null, and if the WiFi IP for the second measurement instance is null, and the cellular IP is not null, and if the cellular network type for the second measurement instance is UMTS, then $N_{WiFiTo3G}$ is incremented. If it is wise-versa, the $N_{3GToWiFi}$ is incremented.

WiFi to 2G or 2G to WiFi Handover Detection

Amongst any two consecutive measurement instances in the measurement time window, if the WiFi IP for the first measurement instance is not null, and the cellular IP is null, and if the WiFi IP for the second measurement instance is null, and the cellular IP is not null, and if the cellular network type for the second measurement instance is EDGE, then $N_{WiFiTo2G}$ is incremented. If it is wise-versa, the $N_{2GToWiFi}$ is incremented.

The mobility features also include position data, such as in the form of GPS coordinates. The changes of longitude and latitude coordinates are calculated similarly as above, i.e. if GPS longitude or GPS latitude at $t_n$ is different than in $t_{n-1}$, then the corresponding NLongitude or NLatitude are increased at each measurement instance within the measurement time window. The aggregated GPS coordinate metrics are NLongitude, NLatitude.

Number of the Samples Per Network Interface

The number of the data samples within the measurement time window that belongs to each network interface is measured. This is used to identify the scenario in a measurement time window. If it is a LTE to WiFi handover scenario, only the RSRP values obtained when the smartphone is connected to LTE should be aggregated. These numbers include NWiFi, N2G, N3G, N4G.

Buffer Status Actions

The buffer status actions include switch/keep the actively connected network interface 1a) WiFi, 1b) 3G and 1c) 4G. If the current connected interface is the same as the newly decided network interface, the interface will be kept. For example, if a smartphone is connected to 4G interface, and if the best decision is handover to 4G, then no handover is performed. The buffer status actions also include 2) re-buffer X bytes or bits (at $T_{action}$). Note that $T_{action}$ is the time instance when the action is performed, which is preferably precisely the time when the decision is made. The buffer status actions also comprise 3) increase the current playback buffer size by Y bytes or bits (at $T_{action}$) and 4) reduce the playout bitrate, i.e. degrade the spatial video quality, to one of the available bitrates in the streaming server. Based on the buffer status actions, the action Type metric can be one of six actions: 1a, 1b, 1c, 2, 3, or 4.

Label

The label is the consequence of the performed buffer status action. The result of the buffer status action is determined at T' seconds after the buffer status action is performed. This corresponds to whether the amount of video data or packets in the video playback buffer is greater than a threshold P' T' seconds after one of the buffer status actions are performed. Thus, the label can be either 0 if the amount of video packets in the video playback buffer is less than P' at $T_{action}$+T' and 1 if the amount of video packets in the playback buffer is greater than P' at $T_{action}$ T'.

Machine Learning Procedure

The data-driven approach is aimed to provide smooth video playback, i.e. without any freezes, and comprises of two phases: a training phase and an actuation phase. The aggregated data in both phases are formed from the raw data.

Raw Data

The following raw data is sampled on the smartphone at every measurement instance: RawDataHeader: {cellularinterfaceIP, wifiInterfaceIP, connectedNetworkType, LTERSRP, LTERSRQ, 3GSignalStrength, 2GSignalStrength, wifiSignalStrength, packetsInPlaybackBuffer, percentageInPlaybackBuffer, isConnectedToWiFi, connectedWiFiAPName, connectedCellularTechnologyName, cellID, GPSLongitude, GPSLatitude}. Next, the raw data within a $T_{window}$ long measureemnt time window is aggregated and the training sets are constructed.

Training Phase

In the training phase, the ML model is trained using the aggregated metrics and buffer status actions and then labeled with the result of the buffer status action. In an embodiment, supervised ML algorithms, such as random-forest, are used. Other alternative ML algorithms that could be used include support vector machine, Neural Networks, K-Nearest Neighbor, and Logistic Regression.

f(metrics,buffer status actions)→label

The training set comprises metrics (the aggregated metric from the raw data), the buffer status actions that are performed randomly, and the label.

TrainingDataHeader: {metrics, buffer status actions, label}

TrainingDataHeader: {$N_{4Gto4G}$, $N_{3Gto3G}$, $N_{2Gto2G}$, $N_{WiFitoWiFi}$, $N_{4Gto3G}$, $N_{3Gto4G}$, $N_{4Gto2G}$, $N_{2Gto4G}$, $N_{2Gto3G}$, $N_{3Gto2G}$, $N_{4GtoWiFi}$, $N_{WiFito4G}$, $N_{WiFito3G}$, $N_{3GtoWiFi}$, $N_{2GtoWiFi}$, $N_{WiFito2G}$, avgRSRP, stdRSRP, minRSRP, maxRSRP, NdownwardsChangeRSRP, NupwardsChangeRSRP, NnoChangeRSRP, avgRSRQ, stdRSRQ, minRSRQ, maxRSRQ, NdownwardsChangeRSRQ, NupwardsChangeRSRQ, NnoChangeRSRQ, avg3GSignal, std3GSignal, min3GSignal, max3GSignal, NdownwardsChange3Gsignal, NupwardsChange3Gsignal, NnoChange3Gsignal, avg2GSignal, std2GSignal, min2GSignal, max2GSignal, NdownwardsChange2Gsignal, NupwardsChange2Gsignal, NnoChange2Gsignal, avgWiFiSignal, stdWiFiSignal, minWiFiSignal, maxWiFiSignal, NdownwardsChangeWiFiSignal, NupwardsChangeWiFiSignal, NnoChangeWiFiSignal, avgBytesInPlaybackBuffer, stdBytesInPlaybackBuffer, minBytesInPlaybackBuffer maxBytesInPlaybackBuffer, NdownwardsChangeBytesInPlaybackBufferl, NupwardsChangeBytesInPlaybackBuffer, NnoChangeBytesInPlaybackBuffer, avgPercentageInPlaybackBuffer, stdPercentageInPlaybackBuffer, minPercentageInPlaybackBuffer maxPercentageInPlaybackBuffer, NdownwardsChangePercentageInPlaybackBuffer, NupwardsChangePercentageInPlaybackBuffer, NnoChangePercentageInPlaybackBuffer, NLongitude, NLatitude, NWiFi, N2G, N3G, N4G, action Type, target}

Figure 14:
FIG. 14 schematically illustrates overall buffer control model processing during a training phase according to an embodiment.

The training set is formed by the data collected on the smartphone. Thus, it is preferred that the training set spans all possible values. This means that the random metrics and random buffer status actions are labeled with the corresponding result, i.e. the target that is 0 or 1, and then the machine learning algorithm is trained. The overall scheme for the training phase is given in FIG. 14. Thus, raw data is collected at each measurement instances within the measurement time window. The raw data is aggregated for each measurement time window and used to produce a metric set. A random buffer status action is chosen for each measurement time window and the video playback buffer status result is labeled (label=1 or 0). The ML model is then trained by inputting the metric set, the buffer status action and the label into the ML model.

In this training phase, for each set of metrics apply each buffer status action, and label it as follows. For example, for metric set 1 and metric set 2, all six buffer status actions (1a, 1b, 1 c, 2, 3, 4) are performed, and they are labeled with the corresponding outcome, i.e. with either 1 or 0. Please see below as an example training set.

MetricSet1, 1a, 0
MetricSet1, 1b, 1
MetricSet1, 1c, 0
MetricSet1, 2, 1
MetricSet1, 3, 1
MetricSet2, 1a, 1
MetricSet2, 1b, 0
MetricSet2, 1c, 0
MetricSet2, 2, 0
MetricSet2, 3, 1
. . .

Actuation Phase In the actuation phase, the raw data is collected and is aggregated for each measurement time window as in the training phase. Next the best buffer status action to be performed is chosen by the buffer control model. The best buffer status action is the one that predicts the target variable as 1, i.e. the label that indicates that the amount of video packets in the video playback buffer is above the threshold P' T' after when the buffer status action is performed, i.e., at $T_{action}$+T'. The userRankingOfActions are also obtained from the user to rank or grade the perceived quality of a given buffer status action by the buffer control model.

UserRankingOfActions

There can be cases when some of the buffer status actions are not preferred by the user as the buffer status actions can be intrusive to the user's video quality of experience. Thus, the user preference as an input from user could also be considered in the buffer control model. This means that the final predicted label is altered from 1 to 0, if not preferred by the user. The buffer control model is re-built with the new user feedback for a performed buffer status action. Thus, together with the buffer status actions, user preferences can be added as good (1) or bad (0).

Example 1

Assume that new raw data is collected, aggregated, and the ML mode is applied. Then, the following predictions are made by the ML model for each buffer status action:
MetricSet, 1a, 0
MetricSet, 1b, 1
MetricSet, 1c, 0
MetricSet, 2, 1
MetricSet, 3, 1
MetricSet, 4, 0

If the user has previously ranked buffer status action 2 as good and the rest of the buffer status actions as bad, although there are three buffer status actions predicted to achieve the result (label=1), the final decision is to perform buffer status action 2 due to its good user ranking.

Example 2

Assume that new raw data is collected, aggregated, and the ML model is applied. Then, the following predictions are made by the ML model for each buffer status action:
MetricSet, 1a, 0
MetricSet, 1b, 1
MetricSet, 1 c, 0
MetricSet, 2, 0
MetricSet, 3, 0
MetricSet, 4, 1

If there are no user ranking given by the user as input, the decision is to randomly choose one of the buffer status actions that yields 1. In other words, the buffer status actions 1b or 4 will be performed (50% of chance to choose each). The user can rank the result after the buffer status action is performed. Assume that the ML model chooses buffer status action 4 and then this buffer status action prevents freeze. However, the user grades this buffer status action as 0 as s/he does not want to watch video with low resolution (low bitrate). The ML model will be re-trained as follows:
MetricSet, 4, 0

Therefore, the ML model likely chooses buffer status action 1b, and performs this buffer status action next time given the same input metric set.

Figure 15:
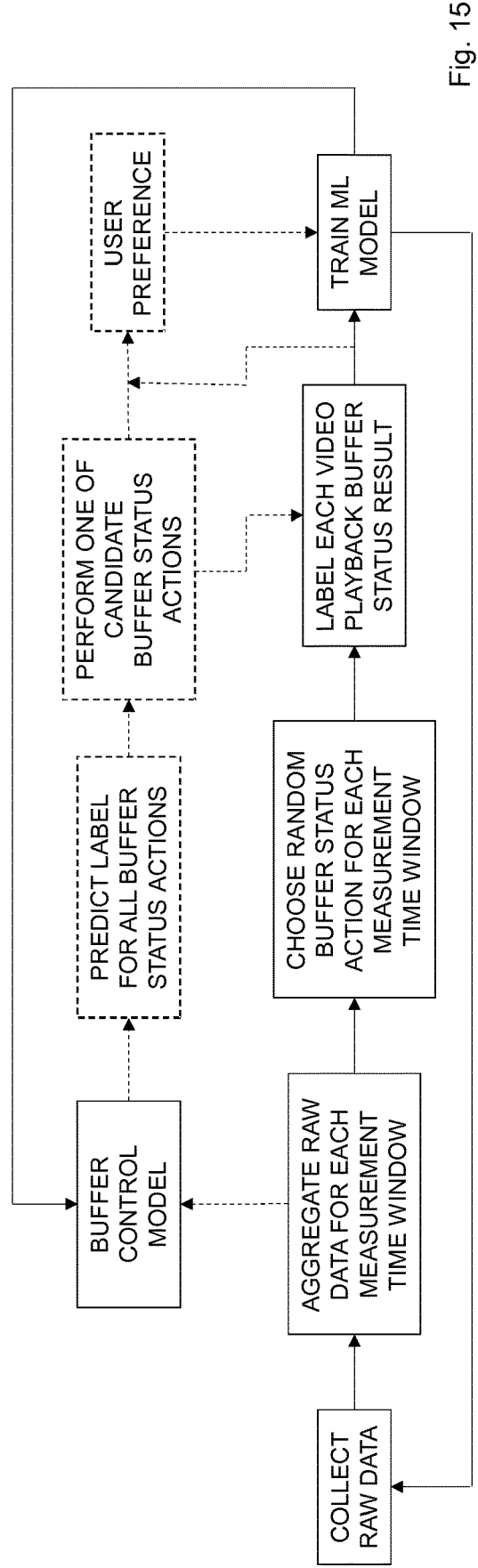
FIG. 15 schematically illustrates overall buffer control model processing during a training phase and an actuation phase according to an embodiment.

The overall scheme that summarizes the approach taken during the training phase (solid lines) and during the actuation phase (broken lines) is illustrated in FIG. 15.

First the raw data is collected from the smartphone API and aggregated. During the training phase, a random buffer status action is chosen amongst the six possible buffer status actions. Next the result of the buffer status action is labelled. The instances of each possible buffer status action with the corresponding aggregated metric set is trained on the ML model. In the actuation phase the labels for six different possible buffer status actions are predicted based on the ML model that is obtained during the training phase. Then one of the buffer status actions that is predicted to give 1 as result is chosen and performed. The result of the performed buffer status action is preferably labelled in the training set, and the model is re-trained with the new result. This way, the ML model is always kept up to date. The result of the buffer status action during the actuation phase is also evaluated with regard to the quality of experience of the user. If the label is 1 but the user experience is 0, then the label is altered from 1 to 0. Thus next time the ML model is trained with this information it will possibly not choose this buffer status action given the same input metrics.

Another aspect of the embodiments relates to a device for controlling a video playback buffer. The device is configured to determine a buffer status metric representing a current amount of video packets in a video playback buffer in a user device. The device is also configured to trigger a buffer status action based on the buffer status metric and at least one of a mobility metric representing a mobility pattern of the user device and a radio quality metric representing a signal strength of a radio channel carrying video packets towards the user device.

In an embodiment, the device is configured to determine a buffer status metric representing at least one of a current number of bytes of video packets in the video playback buffer and a ratio between the current amount of video packets in the video playback buffer and a maximum size of the video playback buffer.

In an embodiment, the device is configured to trigger the buffer status action based on the buffer status metric, the mobility metric and the radio quality metric.

In an embodiment, the device is configured to determine, for a measurement time window encompassing multiple measurement instances, multiple radio quality metrics selected among average signal quality, standard deviation of signal quality, minimum signal quality, maximum signal quality, number of decreases in signal quality at the multiple measurement instances, number of increases in signal quality at the multiple measurement instances and number of measurement instances with no change in signal strength among the multiple measurement instances. The device is also configured to trigger the buffer status action based on the buffer status metric and the multiple radio quality metrics and optionally the mobility metric.

In an embodiment, the device is configured to determine, for a measurement time window comprising multiple measurement instances, multiple mobility metrics selected among number of verticals handovers between radio access networks of different radio access technologies, number of horizontal handovers between radio access points of a same radio access technology and number of changes in position of the user device. The device is also configured to trigger the buffer status action based on the buffer status metric and the multiple mobility metrics and optionally the radio quality metric.

In an embodiment, the device is configured to select the buffer status action from a set of multiple available buffer status actions based on the buffer status metric and the at least one of the mobility metric and the radio quality metric.

In an embodiment, the device is configured to input the buffer status metric and the at least one of the mobility metric and the radio quality metric into a buffer control model. The device is also configured to receive, from the buffer control model, a candidate set of at least one buffer status action among the multiple available buffer status actions that is predicted by the buffer control model to achieve a defined video playback buffer status result. The device is further configured to select a buffer status action from the candidate set of at least one buffer status action.

In an embodiment, the device is configured to trigger a re-buffering of video packets in the video playback buffer based on the buffer status metric and the at least one of the mobility metric and the radio quality metric.

In an embodiment, the device is configured to trigger an increase in a maximum size of the video playback buffer based on the buffer status metric and the at least one of the mobility metric and the radio quality metric.

In an embodiment, the device is configured to trigger a reduction in playback bitrate of video data from the video playback buffer based on the buffer status metric and the at least one of the mobility metric and the radio quality metric.

In an embodiment, wherein the device is configured to trigger a handover from a current radio access network to which the user device is currently connected to another radio access network.

A further aspect of the embodiments relates to a device for determining a buffer control model. The device is configured to input, during a training phase and into a machine learning model, a training set. The training set comprises a buffer status metric representing a current amount of video packets in a video playback buffer, at least one of a mobility metric representing a mobility pattern of a user device comprising the video playback buffer and a radio quality metric representing a signal strength of a radio channel carrying video packets towards the user device, a buffer status action triggered to achieve a video playback buffer status result, and a label indicating whether the buffer status action successfully achieved the video playback buffer status result or not. The device is also configured to repeat, during the training phase, input of different training sets to train the machine learning model into the buffer control model configured to output a candidate set of at least one buffer status action predicted by the buffer control model to achieve a defined video playback buffer status result based on a buffer status metric and at least one of a mobility metric and a radio quality metric.

In an embodiment, the device is configured to determine, at each measurement instance among multiple measurement instances within a measurement time window, at least one of a current number of bytes of video packets in the video playback buffer and a ratio between the current amount of video packets in the video playback buffer and a maximum size of the video playback buffer. The device is also configured to determine, for the measurement time window, multiple buffer status metrics. The multiple buffer status metrics are preferably selected among i) average number of bytes of video packets in the video playback buffer, ii) average ratio between the current amount of video packets in the video playback buffer and the maximum size of the video playback buffer, iii) standard deviation of number of bytes of video packets in the video playback buffer, iv) standard deviation of the ratio between the current amount of video packets in the video playback buffer and the maximum size of the video playback buffer, v) minimum number of bytes of video packets in the video playback buffer, vi) minimum ratio between the current amount of video packets in the video playback buffer and the maximum size of the video playback buffer, vii) maximum of bytes of video packets in the video playback buffer, viii) maximum ratio between the current amount of video packets in the video playback buffer and the maximum size of the video playback buffer, ix) number of increases in bytes of video packets in the video playback buffer at the multiple measurement instances, x) number of increases in the ratio between the current amount of video packets in the video playback buffer and the maximum size of the video playback buffer at the multiple measurement instances, xi) number of decreases in bytes of video packets in the video playback buffer at the multiple measurement instances, xii) number of decreases in the ratio between the current amount of video packets in the video playback buffer and the maximum size of the video playback buffer at the multiple measurement instances, xiii) number of measurement instances with no change in bytes of video packets in the video playback buffer among the multiple measurement instances, and xiv) number of measurement instances with no change in the ratio between the current amount of video packets in the video playback buffer and the maximum size of the video playback buffer among the multiple measurement instances. In such a case, the training set comprises the multiple buffer status metrics, the at least one of the mobility metric and the radio quality metric, the buffer status action and the label.

In an embodiment, the device is configured to determine, at each measurement instance among multiple measurement instances within a measurement time window, at least one signal quality representation of a RSRP, a RSRQ, a 3G signal strength, a 2G signal strength and a local area wireless signal strength. The device is also configured to determine, for the measurement time window, multiple radio quality metrics. The multiple radio quality metrics are preferably selected among average signal quality, standard deviation of signal quality, minimum signal quality, maximum signal quality, number of decreases in signal quality at the multiple measurement instances, number of increases in signal quality at the multiple measurement instances, and number of measurement instances with no change in signal strength among the multiple measurement instances. In this embodiment, the training set comprises the buffer status metric, the multiple radio quality metrics, optionally the mobility metric, the buffer status action and the label.

In an embodiment, the device is configured to determine, at each measurement instance among multiple measurement instances within a measurement time window, least one of number of handovers and position data representing a position of the user device. The device is also configured to determine, for the measurement time window, multiple mobility metrics. The multiple mobility metrics are preferably selected among number of verticals handovers between radio access networks of different radio access technologies, number of horizontal handovers between radio access points of a same radio access technology, and number of changes in position of the user device. In this embodiment, the training set comprises the buffer status metric, the multiple mobility metrics, optionally the radio quality metric, the buffer status action and the label.

In an embodiment, the device is configured to input, during the training phase and into the machine learning model, a training set comprising the buffer status metric, the at least one of the mobility metric and the radio quality metric, a buffer status action triggered to prevent depletion of the video playback buffer, and a label indicating whether the buffer status action successfully prevented depletion of the video playback buffer or not.

In an embodiment, the device is configured to input, during the training phase and into the machine learning model, a training set comprising the buffer status metric, the at least one of the mobility metric and the radio quality metric, a buffer status action selected among a group consisting of a re-buffering of video packets in the video playback buffer, an increase in a maximum size of the video playback buffer, a reduction in playback bitrate of video data from the video playback buffer, and a handover from a current radio access network to which the user device is currently connected to another radio access network, and the label.

In an embodiment, the device is configured to input, during the training phase and into the machine learning model, a user preference indicating whether a user has preference for the buffer status action or not.

In an embodiment, the device is configured to input, during an actuation phase and into the buffer control model, a metric set comprising a buffer status metric representing a current amount of video packets in the video playback buffer, and at least one of a mobility metric representing a mobility pattern of the user device and a radio quality metric representing a signal strength of a radio channel carrying video packets towards the user device. The device is also configured to receive, during the actuation phase and from the buffer control model, a candidate set of at least one buffer status action predicted by the buffer control model to achieve a defined video playback buffer status result based on the buffer status metric and the at least one of the mobility metric and the radio quality metric. The device is further configured to trigger a buffer status action from the candidate set. The device is additionally configured to determine whether the defined video playback buffer status result was successfully achieved or not following triggering the buffer status action. The device is also configured to input, during the actuation phase and into the buffer control model, a training set comprising the buffer status metric, the at least one of the mobility metric and the radio quality metric, the buffer status action and a label indicating whether the defined video playback buffer status result was successfully achieved or not.

In an embodiment, the device is configured to input during the actuation phase and into the buffer control model, a training set comprising the buffer status metric, the at least one of the mobility metric and the radio quality metric, the buffer status action, the label indicating whether the defined video playback buffer status result was successfully achieved or not and a user preference indicating whether a user has preference for the buffer status action or not.

It will be appreciated that the methods and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 16:
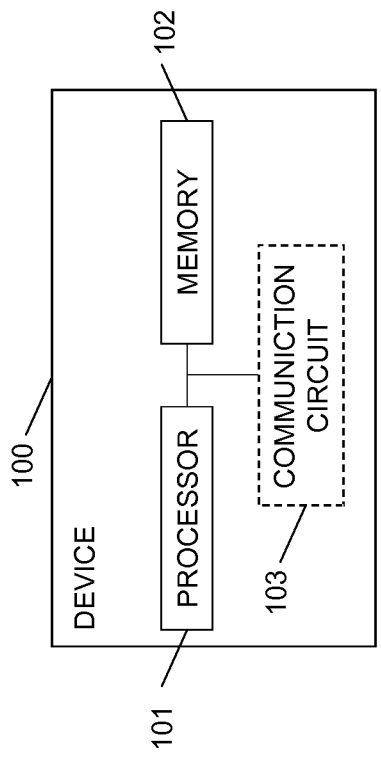
FIG. 16 schematically illustrates a device for controlling buffer status and a device for determining a buffer control model according to an embodiment.

FIG. 16 is a schematic block diagram illustrating an example of a device 100, based on a processor-memory implementation according to an embodiment. In this particular example, the device 100 comprises a processor 101 and a memory 102. The memory 102 comprising instructions executable by the processor 101.

In an embodiment, the device 100 is a device for controlling a video playback buffer. In such a case, the processor 101 is operative to determine the buffer status metric. The processor 101 is also operative to trigger the buffer status action based on the buffer status metric and the at least one of the mobility metric and the radio quality metric.

In an embodiment, the memory 102 comprises the video playback buffer.

In another embodiment, the device 100 is a device for determining a buffer control model. In such a case, the processor 101 is operative to input the training set into the machine learning model. The processor 101 is operative to repeat input of different training sets into the machine learning model to train the machine learning model into the buffer control model.

In an embodiment, the processor 101 is operative to perform the above mentioned functions when executing instructions stored in the memory 102.

Optionally, the device 100 may also include a communication circuit 103. The communication circuit 103 may include functions for wired and/or wireless communication with other devices and/or network nodes in the network. In a particular example, the communication circuit 103 may be based on radio circuitry for communication with one or more other nodes, including transmitting and/or receiving information. The communication circuit 103 may be interconnected to the processor 101 and/or memory 102. By way of example, the communication circuit 103 may include any of the following: a receiver, a transmitter, a transceiver, input/output (I/O) circuitry, input port(s) and/or output port(s).

Figure 17:
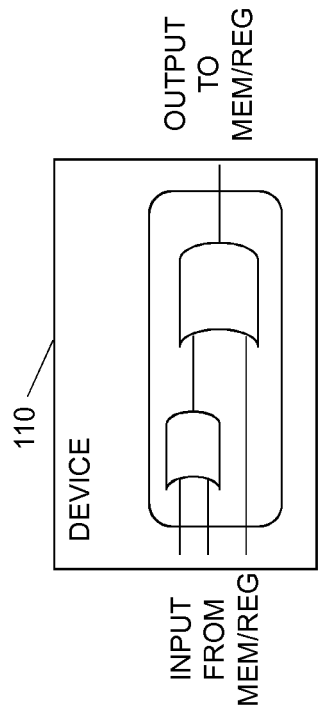
FIG. 17 schematically illustrates a device for controlling buffer status and a device for determining a buffer control model according to another embodiment.

FIG. 17 is a schematic block diagram illustrating another example of a device 100, such as device for controlling a video playback buffer or a device for determining a buffer control model, based on a hardware circuitry implementation according to an embodiment. Particular examples of suitable hardware circuitry include one or more suitably configured or possibly reconfigurable electronic circuitry, e.g. Application Specific Integrated Circuits (ASICs), FPGAs, or any other hardware logic such as circuits based on discrete logic gates and/or flip-flops interconnected to perform specialized functions in connection with suitable registers (REG), and/or memory units (MEM).

Figure 18:
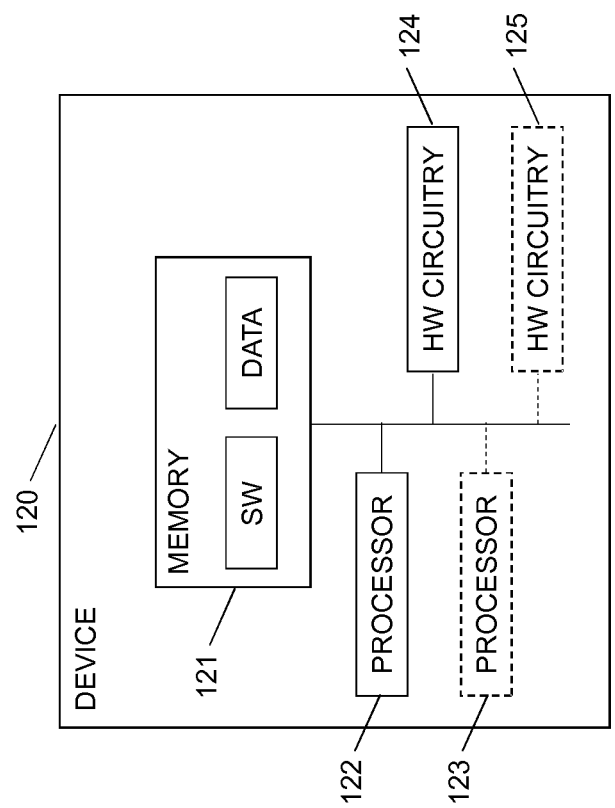
FIG. 18 schematically illustrates a device for controlling buffer status and a device for determining a buffer control model according to a further embodiment.

FIG. 18 is a schematic block diagram illustrating yet another example of a device 120, such as device for controlling a video playback buffer or a device for determining a buffer control model, based on combination of both processor(s) 122, 123 and hardware circuitry 124, 125 in connection with suitable memory unit(s) 121. The device 120 comprises one or more processors 122, 123, memory 121 including storage for software (SW) and data, and one or more units of hardware circuitry 1234, 125. The overall functionality is thus partitioned between programmed software for execution on one or more processors 122, 123, and one or more pre-configured or possibly reconfigurable hardware circuits 124, 125, such as ASICs and/or FPGAs. The actual hardware-software partitioning can be decided by a system designer based on a number of factors including processing speed, cost of implementation and other requirements.

Figure 19:
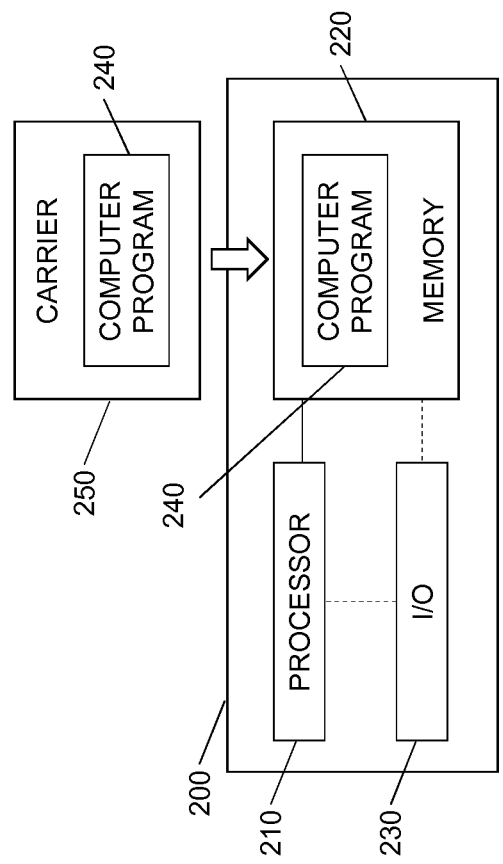
FIG. 19 is a schematic block diagram of a computer-program-based implementation of an embodiment.

FIG. 19 is a schematic diagram illustrating an example of a computer-implementation 200 according to an embodiment. In this particular example, at least some of the steps, functions, procedures, modules and/or blocks described herein are implemented in a computer program 240, which is loaded into the memory 220 for execution by processing circuitry including one or more processors 210. The processor(s) 210 and memory 220 are interconnected to each other to enable normal software execution. An optional input/output (I/O) device 230 may also be interconnected to the processor(s) 210 and/or the memory 220 to enable input and/or output of relevant data, such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 210 is thus configured to perform, when executing the computer program 240, well-defined processing tasks such as those described herein. The processing circuitry does not have to be dedicated to only execute the above-described steps, functions, procedure and/or blocks, but may also execute other tasks.

In a particular embodiment, the computer program 240 comprises instructions, which when executed by at least one processor 210, cause the at least one processor 210 to determine a buffer status metric representing a current amount of video packets in a video playback buffer. The at least one processor 210 is also caused to trigger a buffer status action based on the buffer status metric and at least one of a mobility metric representing a mobility pattern of a user device comprising the video playback buffer and a radio quality metric representing a signal strength of a radio channel carrying video packets towards the user device.

In another particular embodiment, the computer program 240 comprises instructions, which when executed by at least one processor 210, cause the at least one processor 210 to input, during a training phase and into a machine learning model, a training set comprising a buffer status metric representing a current amount of video packets in a video playback buffer, at least one of a mobility metric representing a mobility pattern of a user device comprising the video playback buffer and a radio quality metric representing a signal strength of a radio channel carrying video packets towards the user device, a buffer status action triggered to achieve a video playback buffer status result, and a label indicating whether the buffer status action successfully achieved the video playback buffer status result or not. The at least one processor 210 is also caused to repeat, during the training phase, input of different training sets to train the machine learning model into the buffer control model configured to output a candidate set of at least buffer status action predicted by the buffer control model to achieve a defined video playback buffer status result based on a buffer status metric and at least one of a mobility metric and a radio quality metric.

The proposed technology also provides a carrier 250 comprising the computer program 240. The carrier 250 is one of an electronic signal, an optical signal, an electromagnetic signal, a magnetic signal, an electric signal, a radio signal, a microwave signal, or a computer-readable storage medium.

A further embodiment is a computer-program product 250 comprising a computer-readable medium having stored thereon a computer program 240 as defined above.

By way of example, the software or computer program 240 may be realized as a computer program product, which is normally carried or stored on a computer-readable medium 250, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program 240 may thus be loaded into the operating memory of a computer or equivalent processing device for execution by the processing circuitry 210 thereof.

The flow diagram or diagrams presented herein may be regarded as a computer flow diagram or diagrams, when performed by one or more processors. A corresponding device may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

FIG. 20 is a schematic diagram illustrating an example of a device 130 for controlling a video playback buffer with function modules. The device 130 comprises a determining unit 131 for determining a buffer status metric representing a current amount of video packets in the video playback buffer. The device 130 also comprises a triggering unit 132 for triggering a buffer status action based on the buffer status metric and at least one of a mobility metric representing a mobility pattern of a user device comprising the video playback buffer and a radio quality metric representing a signal strength of a radio channel carrying video packets towards the user device.

FIG. 21 is a schematic diagram illustrating an example of a device 140 for determining a buffer control model 142 with function modules. The device 140 comprises an inputting unit 141 for inputting, during a training phase and into a machine learning model, a training set comprising a buffer status metric representing a current amount of video packets in a video playback buffer, at least one of a mobility metric representing a mobility pattern of a user device comprising the video playback buffer and a radio quality metric representing a signal strength of a radio channel carrying video packets towards the user device, a buffer status action triggered to achieve a video playback buffer status result, and a label indicating whether the buffer status action successfully achieved the video playback buffer status result or not. The inputting device 141 is also for repeating, during the training phase, input of different training sets to train the machine learning model into the buffer control model 142 configured to output a candidate set of at least buffer status action predicted by the buffer control model 142 to achieve a defined video playback buffer status result based on a buffer status metric and at least one of a mobility metric and a radio quality metric.

Alternatively it is possible to realize the function modules in FIGS. 20 and 21 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or ASICs as previously mentioned. Other examples of usable hardware include I/O circuitry and/or circuitry for receiving and/or sending signals. The extent of software versus hardware is purely implementation selection.

Another aspect of the embodiments relates to a user device comprising a device for controlling a video playback buffer according to the embodiments and/or a device for determining a buffer control model according to the embodiments.

The user device may be a mobile phone, a smartphone, a cellular phone, a Personal Digital Assistant (PDA), equipped with radio communication capabilities, a laptop or Personal Computer (PC) equipped with an internal or external mobile broadband modem, a tablet with radio communication capabilities, or any other user device, equipment or terminal capable of receiving video packets within a wireless communication network.

FIG. 22 schematically illustrates an embodiment of a user device 300 comprising a device 304 for controlling a video playback buffer 303. The user device 300 also comprises a video player 302 and a transceiver 301, or a transmitter and a receiver, configured to conduct wireless communication with network nodes, in particular receive video packets therefrom.

The figure also schematically illustrates at least one optional API 305 implemented in the user device 300 in order to retrieve raw data that may be used to derive the mobility and/or radio quality metrics according to the embodiments, such as measured at a RIL in the user device 300.

As is known in the art, the video playback buffer 303, also referred to jitter buffer, temporarily store video packets received by the transceiver 301 or receiver. The video data of the video packets are then forwarded to a video player 302 that performs a decoding of the video data into decoded pictures that are temporarily stored in a decoded picture buffer (DPB) until they are output for display on a screen of or connected to the user device 300.

Other embodiments define a user device 300 comprises a device for determining a buffer control model instead of or as a complement to the device 304 for controlling a video playback buffer 303.

A network node may refer to a base station; access point; network control node, such as network controller, radio network controller, base station controller, access controller, and the like. In particular, the term "base station" may encompass different types of radio base stations including standardized base station functions, such as Node Bs, or evolved Node Bs (eNBs), and also macro/micro/pico radio base stations, home base stations, also known as femto base stations, relay nodes, repeaters, radio access points, Base Transceiver Stations (BTSs), and even radio control nodes controlling one or more Remote Radio Units (RRUs), or the like.

The devices of the embodiments, and in particular the device for determining a buffer control model, may be implemented in such a network node.

It is becoming increasingly popular to provide computing services in network devices, such as network nodes and/or servers, where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

Figure 23:
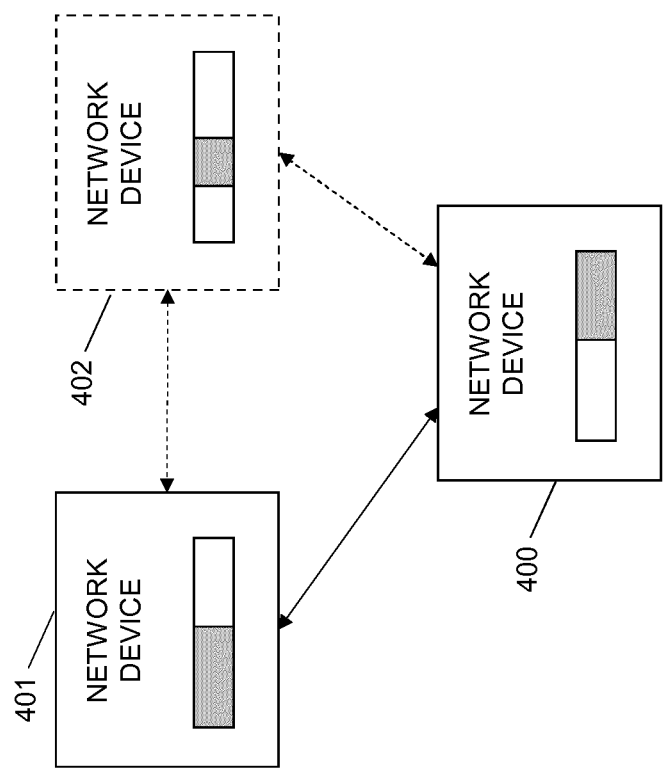
FIG. 23 schematically illustrates a distributed implementation among multiple network devices.

FIG. 23 is a schematic diagram illustrating an example of how functionality can be distributed or partitioned between different network devices 400, 401, 402 in a general case. In this example, there are at least two individual, but interconnected network devices 400, 401, which may have different functionalities, or parts of the same functionality, partitioned between the network devices 400, 401. There may be additional network devices 402 being part of such a distributed implementation. The network devices 400, 401, 402 may be part of the same wireless communication system, or one or more of the network devices may be so-called cloud-based network devices located outside of the wireless communication system.

Figure 24:
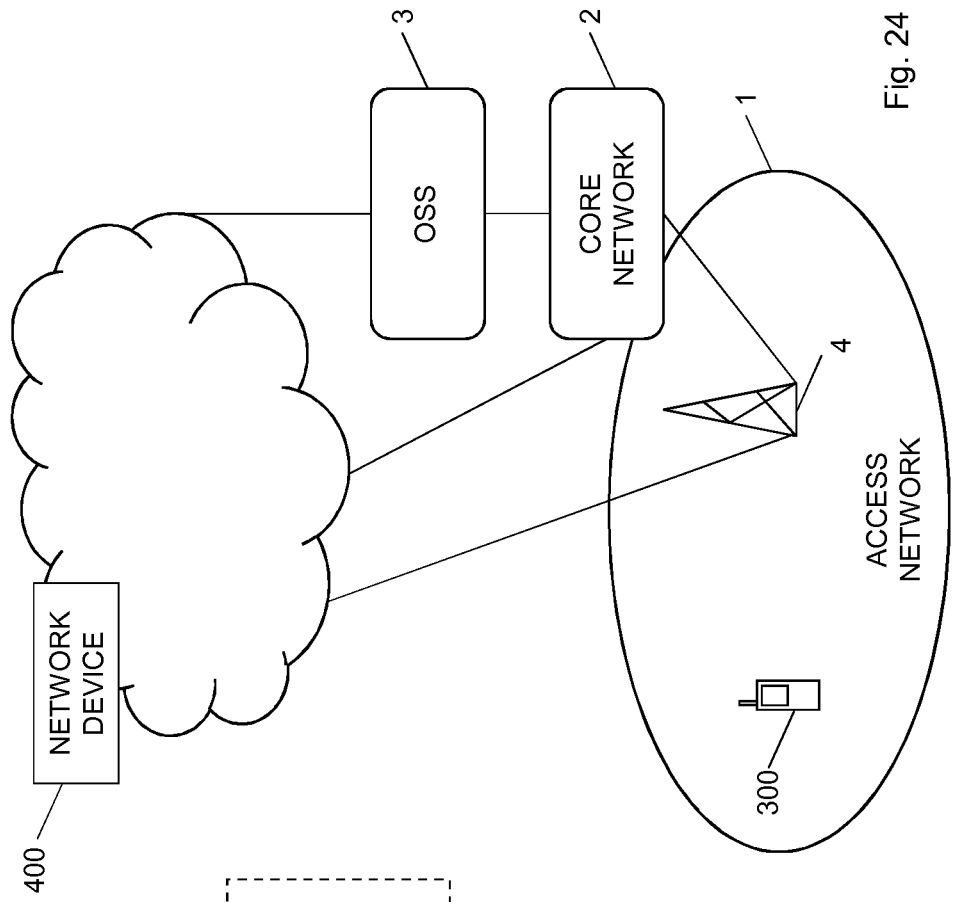
FIG. 24 is a schematic illustration of an example of a wireless communication system with one or more cloud-based network devices according to an embodiment.

FIG. 24 is a schematic diagram illustrating an example of a wireless communication system, including an access network 1 with a network node 4 and/or a core network 2 and/or an Operations and Support System (OSS) 3 in cooperation with one or more cloud-based network devices 400. The figure also illustrates a user device 300 connected to the access network 1 and capable of conducting wireless communication with the network node 4.

Yet another aspect of the embodiments relates to a buffer control model. The buffer control model is configured to receive a buffer status metric representing a current amount of video packets in a video playback buffer and at least one of a mobility metric representing a mobility pattern of a user device comprising the video playback buffer and a radio quality metric representing a signal strength of a radio channel carrying video packets towards the user device. The buffer control model is also configured to output a candidate set of at least one buffer status action predicted by the buffer control model to achieve a defined video playback buffer status result based on the buffer status metric and the at least one of the mobility metric and the radio quality metric.

The buffer control model is preferably determined as previously described herein, such as in connection with FIGS. 7-12, 14-15. The buffer control model is preferably implemented in or at least accessible to a device for controlling a video playback buffer and user device as previously described herein.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method of controlling a video playback buffer in a user device, said method comprising:

determining a buffer status metric specifying a current number of video packets in said video playback buffer or a current amount of video data in the video playback buffer;

triggering a buffer status action based on said buffer status metric that specifies the current amount of video packets in said video playback buffer or the current amount of video data in the video playback buffer and further based on at least a mobility metric representing a mobility pattern of said user device or a radio quality metric representing a signal strength of a radio channel carrying video packets towards said user device; and performing the triggered buffer status action, wherein performing the triggered buffer status action comprises performing at least one of the following steps:

during a given period of time, adding at least X video packets to the video playback buffer while not removing any video packets from the video playback buffer, thereby increasing the number of video packets in the playback buffer by at least X, where X is an integer;

triggering a handover from a current radio access network to which the user device is currently connected to another radio access network;

increasing a maximum size of the video playback buffer; or reducing a playback bitrate of video data from the video playback buffer.

2. The method of claim 1, wherein determining said buffer status metric comprises determining a buffer status metric representing a current number of bytes of video data in said video playback buffer or a ratio between said current amount of video data in said video playback buffer and a maximum size of said video playback buffer.

3. The method of claim 1, wherein triggering said buffer status action comprises triggering said buffer status action based on said buffer status metric, said mobility metric, and said radio quality metric.

4. The method of claim 1, wherein said radio quality metric is selected from at least one of a reference signals received power (RSRP) metric, a reference signals received quality (RSRQ) metric, a 3G signal strength metric, a 2G signal strength metric and a local area wireless signal strength metric.

5. The method of claim 1, further comprising:
determining, for a measurement time window encompassing multiple measurement instances, multiple radio quality metrics selected among average signal quality, standard deviation of signal quality, minimum signal quality, maximum signal quality, number of decreases in signal quality at said multiple measurement instances, number of increases in signal quality at said multiple measurement instances and number of measurement instances with no change in signal strength among said multiple measurement instances, wherein triggering said buffer status action comprises:
triggering said buffer status action based on said buffer status metric and said multiple radio quality metrics.

6. The method of claim 1, wherein said mobility metric comprises position data representing a position of said user device at multiple measurement instances.

7. The method of claim 6, further comprising:
determining, for a measurement time window, multiple mobility metrics selected among number of verticals handovers between radio access networks of different radio access technologies, number of horizontal handovers between radio access points of a same radio access technology and number of changes in position of said user device, wherein triggering said buffer status action comprises:
triggering said buffer status action based on said buffer status metric and said multiple mobility metrics.

8. The method of claim 1, said method further comprising selecting said buffer status action from a set of multiple available buffer status actions based on said buffer status metric and said at least one of said mobility metric and said radio quality metric.

9. The method of claim 8, wherein selecting said buffer status action comprises:
inputting said buffer status metric and said at least one of said mobility metric and said radio quality metric into a buffer control model;

receiving, from said buffer control model, a candidate set of at least one buffer status action among said multiple available buffer status actions that is predicted by said buffer control model to achieve a defined video playback buffer status result; and selecting a buffer status action from said candidate set of at least one buffer status action.

10. A computer program product comprising a non-transitory computer readable medium storing a computer program comprising instructions, which when executed by at least one processor, cause said at least one processor to perform the method of claim 1.

11. A device for controlling a video playback buffer, the device comprising:
a memory; and
a processor coupled to the memory, wherein the device is configured to:
determine a buffer status metric specifying a current number of video packets in a video playback buffer in a user device or a current amount of video data in the video playback buffer;
trigger a buffer status action based on said buffer status metric that specifies the current amount of video packets in said video playback buffer or the current amount of video data in the video playback buffer and further based on at least a mobility metric representing a mobility pattern of said user device or a radio quality metric representing a signal strength of a radio channel carrying video packets towards said user device; and
perform the triggered buffer status action, wherein the device is configured to perform the triggered buffer status action by performing a process that includes at least one of the following steps:
during a given period of time, adding at least X video packets to the video playback buffer while not removing any video packets from the video playback buffer, thereby increasing the number of video packets in the playback buffer by at least X, where X is an integer;
triggering a handover from a current radio access network to which the user device is currently connected to another radio access network;
increasing a maximum size of the video playback buffer; or
reducing a playback bitrate of video data from the video playback buffer.

12. The device of claim 11, wherein the process includes at least one of the following three steps:
during a given period of time, adding at least X video packets to the video playback buffer while not removing any video packets from the video playback buffer, thereby increasing the number of video packets in the playback buffer by at least X, where X is an integer;
triggering a handover from a current radio access network to which the user device is currently connected to another radio access network; or
reducing a playback bitrate of video data from the video playback buffer.

13. The device of claim 11, wherein the process includes at least one of the following two steps:
during a given period of time, adding at least X video packets to the video playback buffer while not removing any video packets from the video playback buffer, thereby increasing the number of video packets in the playback buffer by at least X, where X is an integer; or
triggering a handover from a current radio access network to which the user device is currently connected to another radio access network.

14. The device of claim 11, wherein the process includes the step of adding at least X video packets to the video playback buffer during a given period of time while not removing any video packets from the video playback buffer during the given period of time, thereby increasing the number of video packets in the playback buffer by at least X, where X is an integer.

15. The device of claim 11, wherein
the buffer status metric represents a current number of bytes of video data in said video playback buffer or a ratio between said current amount of video data in said video playback buffer and a maximum size of said video playback buffer, and
the device is configured to trigger said buffer status based on said buffer status metric, said mobility metric, and said radio quality metric.

16. The device of claim 11, wherein
the device is further configured to determine, for a measurement time window encompassing multiple measurement instances, multiple radio quality metrics selected among average signal quality, standard deviation of signal quality, minimum signal quality, maximum signal quality, number of decreases in signal quality at said multiple measurement instances, number of increases in signal quality at said multiple measurement instances and number of measurement instances with no change in signal strength among said multiple measurement instances, and
the device is configured to trigger said buffer status action based on said buffer status metric and said multiple radio quality metrics.

17. The device of claim 11, wherein
said mobility metric comprises position data representing a position of said user device at multiple measurement instances,
the device is further configured to determine, for a measurement time window, multiple mobility metrics selected among number of verticals handovers between radio access networks of different radio access technologies, number of horizontal handovers between radio access points of a same radio access technology and number of changes in position of said user device, and
the device is configured to trigger said buffer status action based on said buffer status metric and said multiple mobility metrics.

18. The device of claim 11, wherein
the device is further configured to select said buffer status action from a set of multiple available buffer status actions based on said buffer status metric and further based on said mobility metric and/or said radio quality metric, and
the device is configured to select said buffer status action by performing a process that includes:
inputting said buffer status metric and said at least one of said mobility metric and said radio quality metric into a buffer control model;
receiving, from said buffer control model, a candidate set of at least one buffer status action among said multiple available buffer status actions that is predicted by said buffer control model to achieve a defined video playback buffer status result; and
selecting a buffer status action from said candidate set of at least one buffer status action.

19. A method of controlling a video playback buffer in a user device, said method comprising:
determining a buffer status metric specifying a current amount of video packets in said video playback buffer; and
triggering a buffer status action based on said buffer status metric that specifies the current number of video packets in said video playback buffer and based on information indicating a number of handovers experienced by the user device within a measurement time window, wherein
the information indicating a number of handovers experienced by the user device within a measurement time window comprises at least one: of i) a number of vertical handovers between radio access networks of different radio access technologies, ii) a number of horizontal handovers between radio access points of a same radio access technology, or iii) a number of changes in position of the user device.

20. The method of claim 19, wherein
the information indicating a number of handovers experienced by the user device within a measurement time window comprises a number of handovers as determined by the user device.

21. A method of controlling a video playback buffer in a user device, said method comprising:
determining a buffer status metric specifying a current amount of video packets in said video playback buffer; and
triggering a buffer status action based on said buffer status metric that specifies the current number of video packets in said video playback buffer and based on information indicating a number of handovers experienced by the user device within a measurement time window, wherein
wherein a handover comprises at least one of: i) a change in cellular identifier without a change in cellular IP address or a change in the cellular network type; ii) a change in WiFi access point name without a change in WiFi IP address; iii) a change in a cellular network type but no change in cellular IP address; or iv) a change between a cellular IP address and a WiFi IP address, and a change in network type.

22. A method of controlling a video playback buffer in a user device, the method comprising:
determining a buffer status metric specifying a current amount of video packets in the video playback buffer;
inputting into a buffer control model the buffer status metric together with a mobility metric and/or a radio quality metric, wherein the mobility metric represents a mobility pattern of the user device and the radio quality metric represents a signal strength of a radio channel carrying video packets towards the user device;
as a result of inputting into the buffer control model the buffer status metric together with the mobility metric and/or the radio quality metric, receiving from the buffer control model candidate information indicating a set of M buffer status actions, wherein the set of M buffer status actions is selected by the buffer control model from a set of N available buffer status actions, where N>M and M>1, wherein the candidate information includes first candidate information indicating a first buffer status action and second candidate information indicating a second buffer status action, and each of the buffer status actions included in the set is predicted by the buffer control model to achieve a defined video playback buffer status result;

selecting a buffer status action from the candidate set of buffer status actions; and performing the selected buffer status action.

\* \* \* \* \*